United States Patent
Yoshida et al.

(10) Patent No.: US 6,571,065 B1
(45) Date of Patent: May 27, 2003

(54) SPECIFICATION-VARIABLE CAMERA

(75) Inventors: Hitoshi Yoshida, Hachioji (JP);
Masako Suzuki, Hachioji (JP);
Yukihiko Sugita, Kokubunji (JP);
Yoshiaki Kobayashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/696,112

(22) Filed: Oct. 25, 2000

(30) Foreign Application Priority Data

| Oct. 29, 1999 | (JP) | ............................................. | 11-310188 |
| Oct. 29, 1999 | (JP) | ............................................. | 11-310189 |
| Oct. 29, 1999 | (JP) | ............................................. | 11-310190 |
| Oct. 29, 1999 | (JP) | ............................................. | 11-310191 |

(51) Int. Cl.[7] ............................................. G03B 17/00
(52) U.S. Cl. ........................ 396/299; 396/542; 396/543
(58) Field of Search ................................ 396/238, 297, 396/299, 300, 213, 242, 541, 542, 543

(56) References Cited

U.S. PATENT DOCUMENTS

| 5,016,034 A | 5/1991 | Goto |
| 5,184,169 A | 2/1993 | Nishitani |

FOREIGN PATENT DOCUMENTS

| JP | 55-84930 | 6/1980 | |
| JP | 5-150330 | 6/1993 | |
| JP | 6-43532 | 2/1994 | |
| JP | 06-043532 | * 2/1994 | ........... G03B/17/02 |

OTHER PUBLICATIONS

Copy of related U.S. patent application Ser. No. 09/696,771, filed Oct. 26, 2000; title: Camera Enabling the Change in the Product Specifications, and a Method of Manufacturing; Inventors: Kazuo Mikami, Yoshiaki Kobayashi and Yukihiko Sugita.

* cited by examiner

Primary Examiner—Russell Adams
Assistant Examiner—Arthur A Smith
(74) Attorney, Agent, or Firm—Frishauf, Holtz, Goodman & Chick, P.C.

(57) ABSTRACT

A specification-variable camera comprises a plurality of switches. A specification-change member renders a predetermined combination of the plurality of switches conductive. An operation member is used to select a mode of the camera. A detection switch serves to detect an operation on the operation member. A control means is compatible with a plurality of specifications. The control means sets a mode of the camera in correspondence with conducting states of the switches, when an output is supplied from the detection switch. The specification of the camera is changed by changing the combination of the conducting states of the switches.

28 Claims, 16 Drawing Sheets

| | 1<br>(DSSW=000) | 2<br>(DSSW=001) | 3<br>(DSSW=010) | 4<br>(DSSW=011) | 5<br>(DSSW=100) | 6 | 7 | 8 |
|---|---|---|---|---|---|---|---|---|
| SW1 | ON | OFF | ON | OFF | ON | OFF | ON | OFF |
| SW2 | ON | ON | OFF | OFF | ON | ON | OFF | OFF |
| SW3 | ON | ON | ON | ON | OFF | OFF | OFF | OFF |

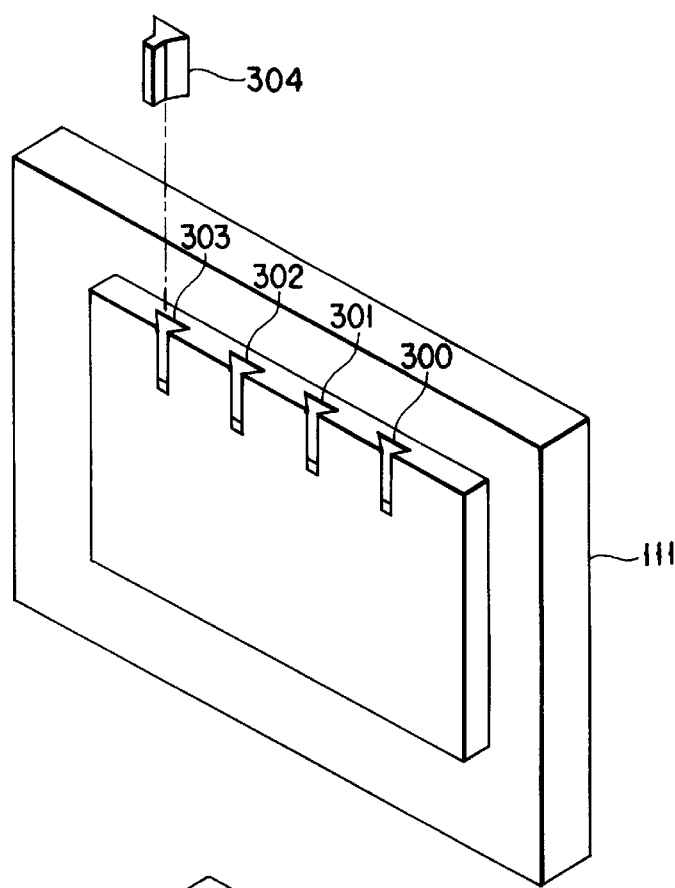
F I G. 6
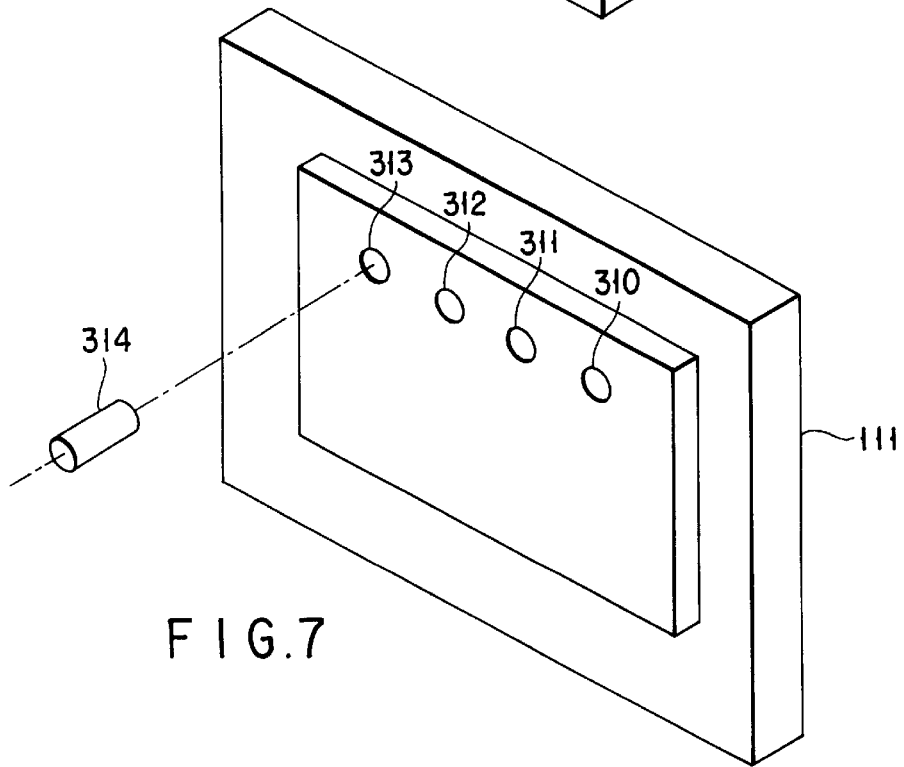
F I G. 7

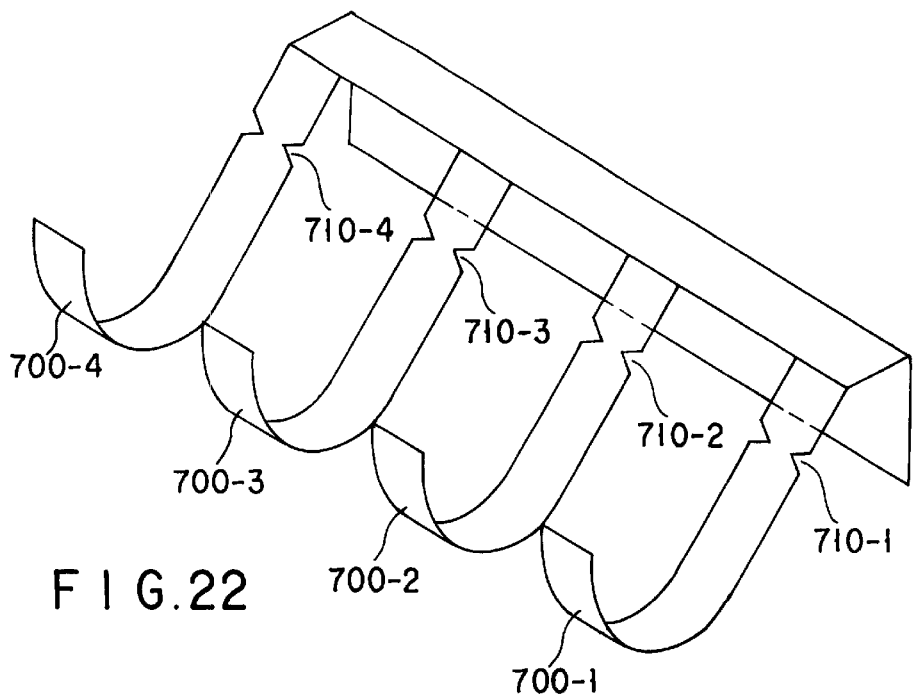
F I G. 22
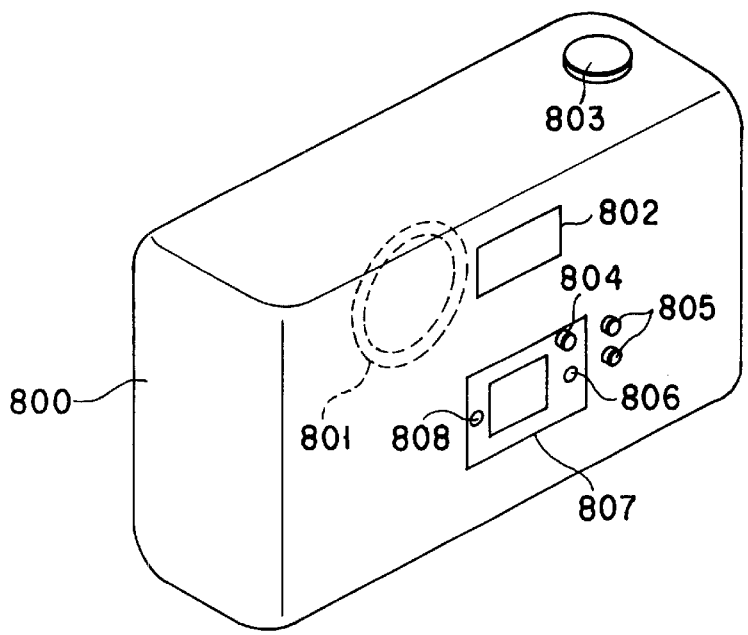
F I G. 23

SPECIFICATION-VARIABLE CAMERA

CROSS-REFERENCE TO RELATED APPLICATIONS

This application is based upon and claims the benefit of priority from the prior Japanese Patent Applications No. 11-310188, filed Oct. 29, 1999; No. 11-310189, filed Oct. 29, 1999; No. 11-310190, filed Oct. 29, 1999; and No. 11-310191, filed Oct. 29, 1999, the entire contents of which are incorporated herein by reference.

BACKGROUND OF THE INVENTION

The present invention relates to a camera and particularly to a camera capable of selecting one from a plurality of specifications.

In recent electrical cameras, various modes can be selected when taking a picture. There are widely spreading products that can perform photographing suitable for a scene to be taken by selecting various modes in accordance with the scene.

However, functions unnecessary for users may increase and operation may be complicated if the number of modes is increased to respond to a plurality of scenes to be photographed or to attain a special photographing effect or so, as described above.

For example, as disclosed in Japanese Patent Application KOKAI Publications No. 55-84930 and No. 5-150330, proposals have been made for cameras whether or not a data recording function should be added can be selected manually by a user, if the camera has an attachable data recording device thereto. According to this method, however, the data recording function is the only one selectable specification and unpreferably causes the user to labor much.

Also, since demands from users have become diversified, it is difficult to satisfy users' demands by one product, and products with a plurality of specifications have been expected. To change the specification of a product, however, the components inside the product and the control program must be changed. Manufacturing process must also be reconsidered in accordance with the changes, so the cost-up is involved and the specifications that are requested from users cannot be provided immediately.

As described above, conventional cameras have problem in that as the number of modes increases, functions which are not necessary for some users increase and the operation is complicated. Also, there is a problem that cost-up is involved to change the specification of a product and that specifications requested from users are difficult to satisfy immediately.

BRIEF SUMMARY OF THE INVENTION

The present invention hence has an object of providing a camera capable of selecting a plurality of specifications with a simple structure and easy operations.

To achieve the above object, according to the first aspect of the present invention, there is provided a camera capable of changing a specification, comprising: a plurality of switches; a specification-change member for rendering a predetermined combination of the plurality of switches conductive; an operation member for selecting a mode of the camera; a detection switch for detecting an operation on the operation member; and control means compatible with a plurality of specifications, for setting a mode of the camera in correspondence with conducting states of the plurality of switches, when an output is obtained from the detection switch, wherein the specification of the camera can be changed by changing a combination of conducting switches among the plurality of switches.

According to the second aspect of the present invention, there is provided a camera capable of changing a specification, comprising: a plurality of contact points; a plurality of segment hold sections capable of holding a plurality of segments capable of contacting the plurality of contact points; a conductive member by which those segments among the segments that are attached in a predetermined combination to the plurality of segment holding sections can be rendered conductive; an operation member for selecting a mode of the camera; a detection switch for detecting an operation on the operation member; and control means compatible with a plurality of specifications, for setting a mode of the camera in correspondence with conducting states of conductions between the plurality of contact points and the plurality of segments, wherein a desired specification can be obtained by selecting a segment or segments to be attached to the plurality of segment holding sections.

According to the third aspect of the present invention, there is provided a camera capable of changing a specification, comprising: a specification setting switch comprised of a plurality of switches; a specification-change member for turning ON/OFF the plurality of switches of the specification-setting switch in a predetermined combination; an operation member for selecting a mode of the camera; a mode selection switch for detecting an operation on the operation member; and control means compatible with a plurality of specifications, for determining a mode based on a combination of ON/OFF states of the specification-setting switch, when an output is obtained from the mode selection switch, wherein the specification of the camera is changed by changing the combination of ON/OFF states of the plurality of switches.

According to the fourth aspect of the present invention, there is provided a camera capable of changing a specification, comprising: a plurality of contact points; a segment having a plurality of contact sections respectively contactable with the plurality of contact points, and a connection section where the plurality of contact sections are connected together; a specification-change member capable of making the plurality of contact points and the plurality of contact sections contact with each other in a predetermined combination; an operation member for selecting a mode of the camera; a detection switch for detecting an operation on the operation member; and control means compatible with a plurality of specifications, for determining a mode to be selected next, based on a contact state between the plurality of contact points and the plurality of contact sections, when an output is obtained from the detection switch with the camera set in an arbitrary mode state, wherein the specification of the camera is changed by changing a combination of the conducting states between the plurality of contact points and the plurality of contact sections.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a view showing a first example which realizes a switch operation member for turning ON a switch.

FIG. 7 is a view showing a second example which realizes a switch operation member for turning ON a switch.

FIG. 22 is a view showing a modification example of an electric segment.

FIG. 23 is a view showing a modification example of an installation position of the LCD window.

DETAILED DESCRIPTION OF THE INVENTION

Embodiments of the present invention will now be explained with reference to the drawings.

Embodiment 1

Figure 1:
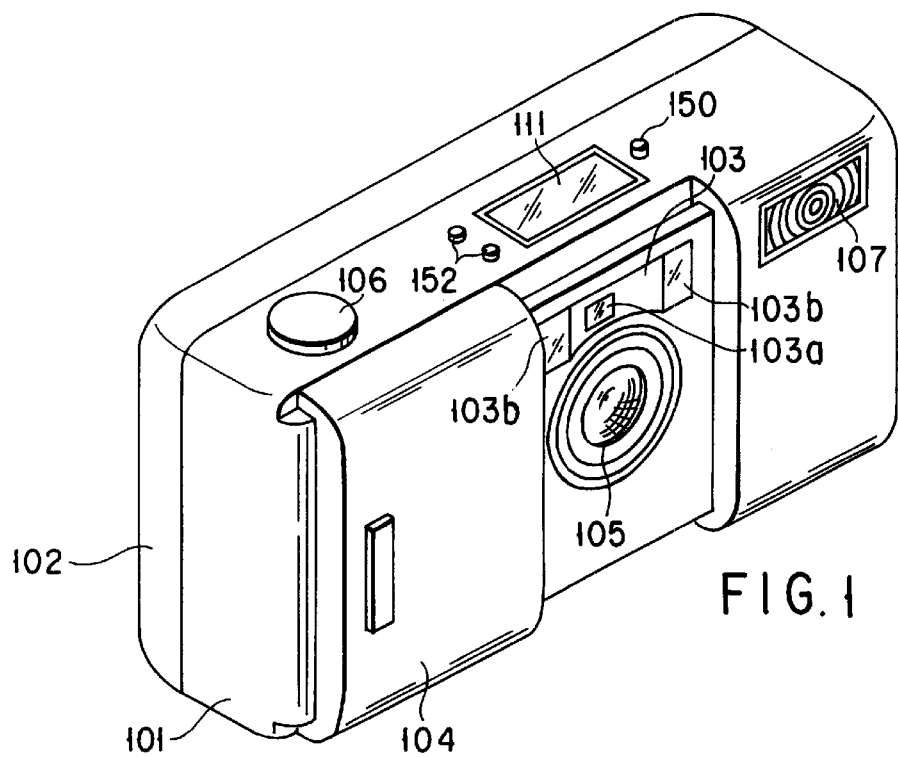
FIG. 1 is an outer perspective view of a camera to which the first embodiment of the present invention is applied.

FIG. 1 is an outer perspective view of a camera to which the first embodiment of the present invention is applied. As shown in FIG. 1, a photographing lens barrel 105 is provided at the center section of the front section of the camera. A finder object window 103a and distance-measuring windows 103b are provided above the barrel 105 on the front panel 103. Further, a barrier 104 is provided to protect the photographing lens barrel 105, finder object window 103a and distance-measuring windows 103b. Further, a flashing light emission window 107 is provided in the right-hand side on the front surface of the camera.

A release button 106 is provided in the left-hand side of an upper section of the camera, and a LCD (Liquid Crystal Display) window (specification-variable member) 111 is provided at the center of the upper section. A camera maker can change the specification of the camera to an another specification in accordance with a user's desire just by changing the LCD window 111 to another one.

A first mode setting button (DMSW) 150 and second mode setting buttons 152 are provided in the peripheral section of the LCD window 111. The second mode setting buttons 152 are buttons (operation member) used to set a mode used for specifications common to all cameras. The first mode-setting button 150 is a button (operation member) to set a mode for adding a specification to the camera by replacing the LCD window 111. Further, front and rear covers 101 and 102 construct the exterior surfaces of the camera body.

Figure 2:
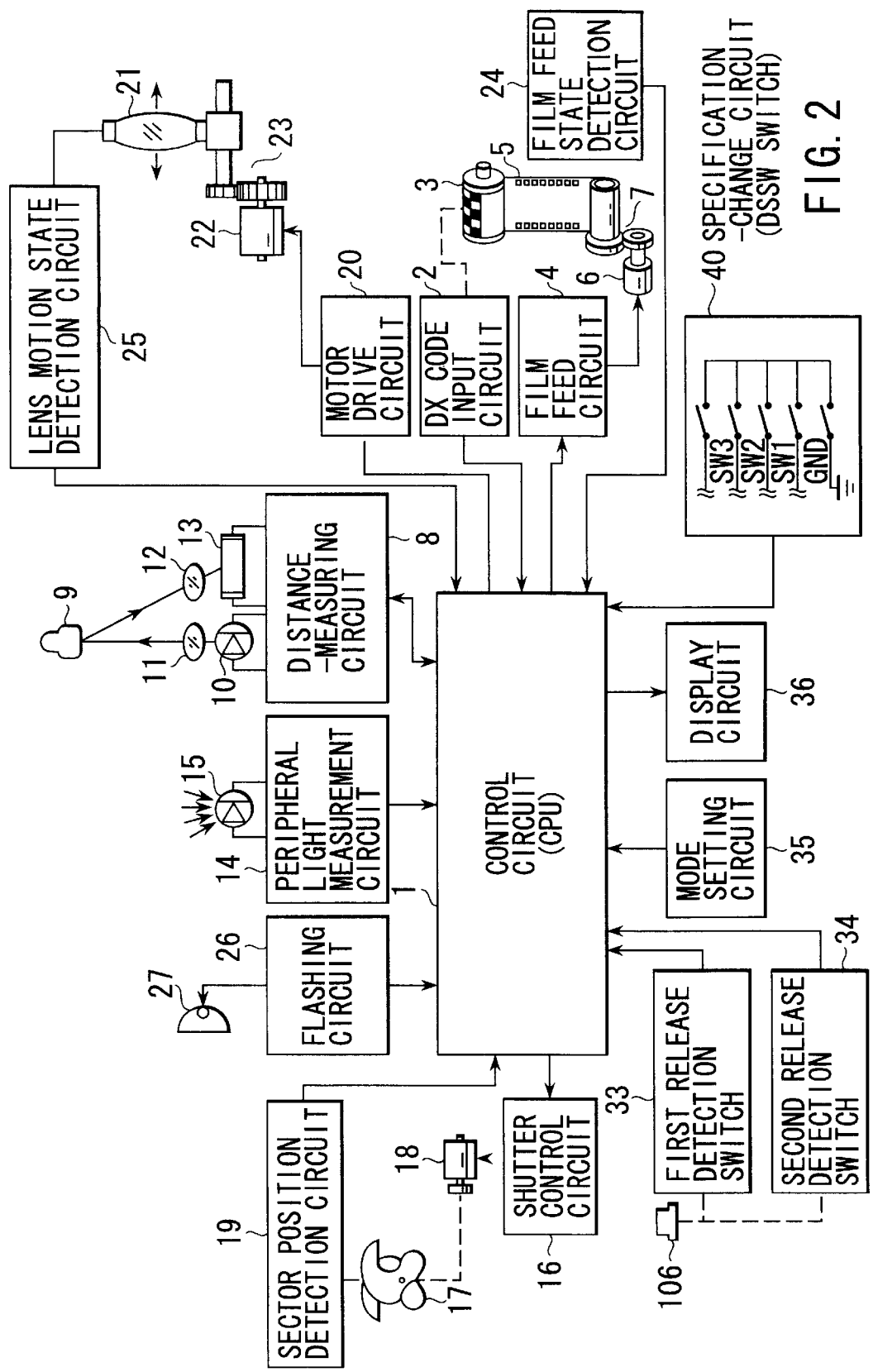
FIG. 2 is a functional block diagram of the entire camera.

FIG. 2 is a functional block diagram of the entire camera. A control circuit (control means) 1 is a circuit for controlling respective sections of the camera and is constructed by a CPU. A rolled film 5 is contained in a film cartridge 3. A film feed circuit 4 drives and control a film feed mechanism 7 by a film feed motor 6 to feed the film supplied from the cartridge 3. A film feed state detection circuit 24 detects perforation of the film 5 during operation of feeding a film, thereby to know the travel amount of the film 5. When the film cartridge 3 is loaded in the camera body, a DX code input circuit 2 reads film information such as ISO sensitivity or the like from a DX code provided on the cartridge 3 by printing or so.

A distance-measuring circuit 8 is a distance-measuring means for measuring a distance to a main object 9 positioned at the substantial center of a photographing screen. In this case, for example, light flux emitted from a light projection element 10 comprised of a light emission diode (LED) or the like is projected to the object 9 through a light projection lens 11. Reflected signal light from the object 9 is converged by a light receiving lens 12 and is received by a light receiving element 13 comprised of a photosensitive detector (PSD) element or the like. Based on the light receiving position of the reflected signal light, the distance to the object 9 is measured.

A peripheral light measurement circuit 14 is constructed, for example, by a photometric sensor 15 and measures the field luminance or the like including the object 9.

A flashing circuit 26 performs light emission control and charging of a flashing unit including a light emission section constructed by a reflector, Xenon (Xe) tube, and the like.

A shutter control circuit 16 performs drive control of a plunger 18 as a drive mechanism for opening/closing a sector shutter 17 having a shutter blade which also serves as a diaphragm for opening/closing the exposure aperture. A sector position detection circuit 19 serves to detect the position of the sector shutter 17. Detection results thereof are used to make operation of opening/closing the exposure aperture.

First and second release detection switches 33 and 34 are each turned ON/OFF in response to operation states of the release button 106 for instructing a photographing start, i.e., an ON-state (half-pressed state) in the first step and another ON-state (full-pressed state) in the second step. The ON and OFF states are notified to the control circuit 1.

A mode setting circuit 35 serves to set various operation modes for the camera and comprises the first and second mode setting buttons 150 and 152.

A display circuit 36 is constructed by a LCD (Liquid Crystal Display element) and serves to display operation modes and photographing conditions of the camera.

Based on object distance information obtained by the distance-measuring circuit 8, a motor drive circuit 20 drives and controls a drive motor 22 to move in an optical axis direction a focus adjust lens 21 of a photographing optical system held in a lens barrel, by means of a focus drive mechanism 23.

A lens motion state detection circuit 25 detects a motion state of the focus adjust lens 21 from a reference position. The detection is supplied to the control circuit 1 and used to determine a stop position of the moving focus adjust lens 21.

A specification-change circuit (DSSW switch) 40 is constructed by a plurality of switch segments (GND and SW1 to SW3) used to change the specification of the camera. In the present embodiment, the switch segment GND for the ground and any combination of the switch segments SW1 to SW3 are turned ON to determine the specification of the camera.

Figure 3:
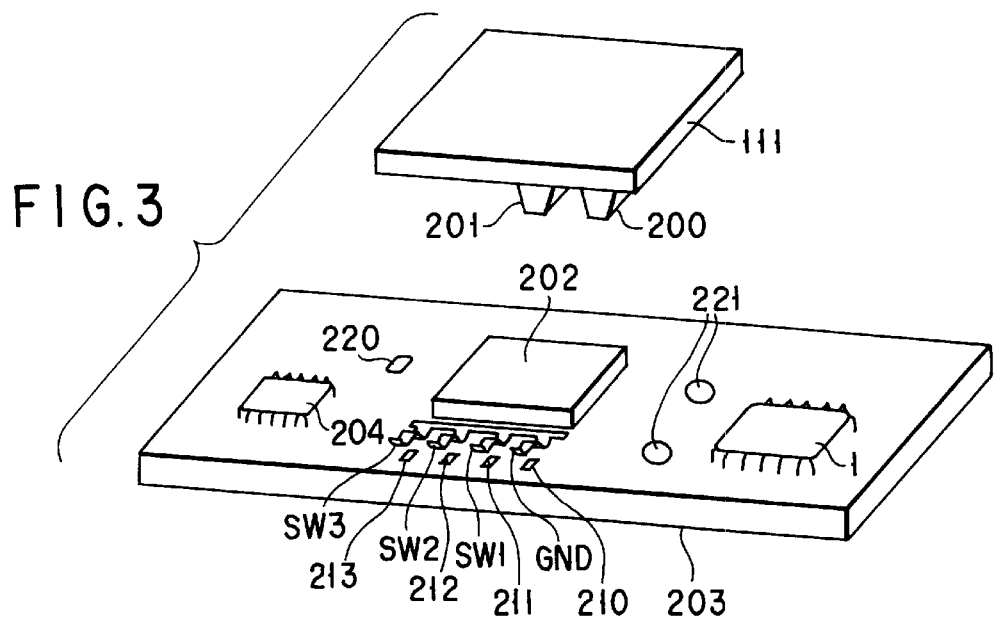
FIG. 3 is a view for explaining the structure of the camera according to the first embodiment of the present invention.

FIG. 3 is a view for explaining the structure of the camera according to the first embodiment of the present invention, observed from the back of the camera. Projections 200 and 201 are provided on the lower surface of the LCD window 111. Also, an EEPROM 204 for storing adjustment data necessary for control of the camera and data indicating the state of the camera, a LCD (Liquid Crystal Display) device 202, and a CPU 1 are mounted on a hard main board (electric board) 203. A GND segment (ground) and switch segments SW1 to SW3 connected by common electric segments are provided adjacent to the LCD 202. Contact points 210 to 213 are provided in correspondence with the GND segment and the switch segments SW1 to SW3. Further, a first mode setting button pattern 220 and second mode setting button patterns 221 are provided in correspondence with the first and second mode setting buttons 150 and 152, respectively.

Figures 4A, 4B, 5:
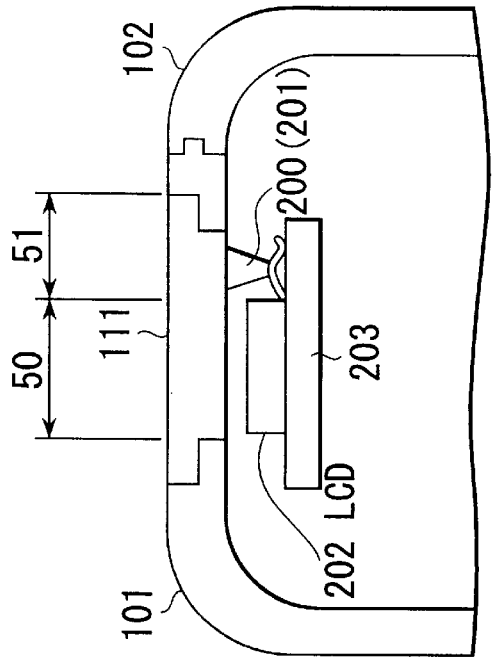
FIG. 4A is an enlarged side view showing a section of the LCD window 111.
FIG. 4B is a cross-sectional view showing the LCD window 111 and its periphery where the LCD window 111 is attached to a camera body.
FIG. 5 is a table showing correspondence between the states of respective switch segments and the specifications of the camera.

FIG. 4A is a side view showing an enlarged section of the LCD window 111 in FIG. 3.

FIG. 4B is a cross-sectional view showing the LCD window 111 and its periphery, when the LCD window 111 is attached to the camera body. The LCD window 111 is installed on the upper surface of the exterior of the camera body, which is constructed by the front cover 101 and rear covers 102. Along the exterior surface of the camera body, the main board 203 is provided at a position where the board faces the LCD window 111. In this state, the GND segment and the switch segment SW1 are pressed from the upside by the projections 200 and 201 provided on the lower surface of the LCD window 111, so these segments contact with the contact points 210 and 211 shown in FIG. 3 and are thereby turned ON. On the other hand, the switch segments SW2 and SW3 are not pressed by the projections and left turned OFF.

In the example described above, the projections 200 and 201 are provided to turn on the GND segment and the switch segment SW1. However, the control circuit 1 can selectively set one specification if it is arranged such that any combination among the switch segments SW1 to SW3 is turned ON depending on the specification of the camera. Suppose that the GND segment is always turned ON in the present embodiment.

The LCD window 111 has a light-transmissible section 50 through which the LCD 202 can be observed, and a light-shielding section 51 which shields the switch segments and the contact points connectable thereto.

FIG. 5 is a table showing correspondence between the specifications of the camera and the states of the switch segments SW1 to SW3. Although eight combinations can be considered from the switch segments SW1 to SW3, only five kinds of specifications are defined in this table. For example, when all of the SW1, SW2, and SW3 are ON, the first specification (DSSW=000) is selected. When the SW1 is OFF and the SW2 and SW3 are ON, the second specification (DSSW=001) is selected. When the SW1 is ON, the SW2 is OFF, and the SW3 is ON, the third specification (DSSW=010) is selected. When the SW1 and the SW2 are OFF and the SW3 is ON, the fourth specification (DSSW=011) is selected. When the SW1 and the SW2 are ON and the SW3 is OFF, the fifth specification (DSSW=100) is selected. Further, in the present embodiment, a catch light mode is added to the specification of the camera in the first specification (DSSW=000). In the second specification (DSSW=001), the specification of the camera is added with an ability to select a red-eye reduction mode if it is necessary when emitting flash light. In the third specification (DSSW=010), the camera is added with an infinity mode which can set focus adjustment to infinity if necessary. In the fourth specification (DSSW=011), the camera is added with a mode for continuous photographing mode which enables continuous photographing if necessary. In the fifth specification (DSSW=100), the camera is added with a real-time release mode (RT mode) which reduces release time lag if necessary.

FIG. 6 is a view showing a first example which realizes a switch operation member to turn ON a switch. As shown in FIG. 6, dovetail grooves 300 to 303 are provided as switch operation member installation sections in the lower surface of the LCD window 111 as a specification-change means. In dovetail grooves selected from the dovetail grooves 300 to 303 in accordance with the specification of the camera, a plurality of switch operation members 304 having shapes matched with the dovetail grooves are engaged thereby forming projections to press switches. Suppose that the switch operation member is always selected in the present embodiment.

FIG. 7 shows a second example which realizes a switch operation member to turn ON a switch. As shown in FIG. 7, columnar grooves (circular blind hole) 310 to 313 are provided as switch operation member installation sections in the lower surface of the LCD window 111 as a specification-change means. Into grooves selected from the grooves 310 to 313 in accordance with the specification of the camera, a plurality of pins 314 as switch operation members are pressed in thereby forming projections to press switches. Suppose that the switch operation member is always selected in the present embodiment.

Figure 8:
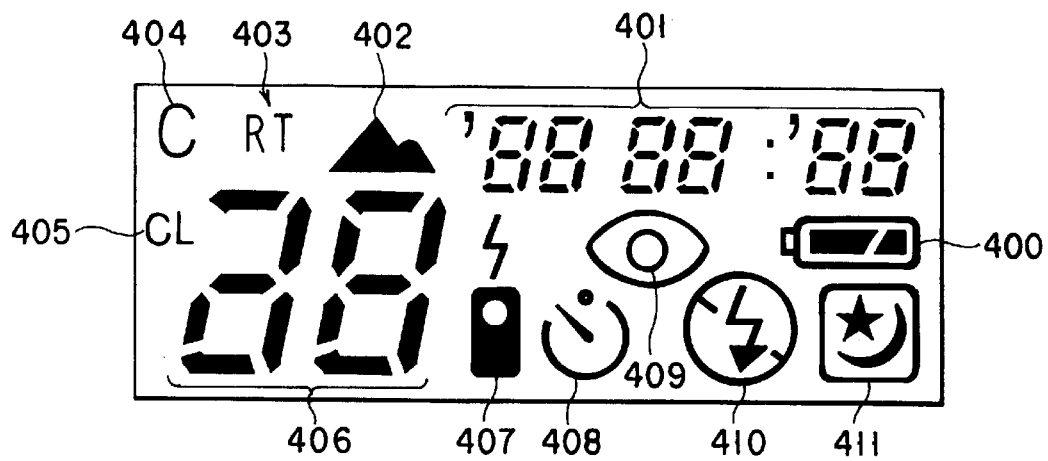
FIG. 8 is a view showing a display example of a LCD display section according to the first embodiment of the present invention.

FIG. 8 is a view showing a display example of the LCD display circuit according to the first embodiment. The present embodiment includes all segments that are normally necessary for display of a camera. FIG. 8 shows a state where alls the segments are lightened. As signs which indicate modes of the camera, there are mode display signs of infinity (∞) 402, real-time release (RT) 403, continuous photographing 404, catch light (CL) 405, remote control 407, self 408, red eye 409, flash 410, night view 411, and the like. The reference 401 denotes a date indication. The reference 400 denotes a battery indication. The reference 406 denotes a flame number indication. Segments are lightened in accordance with the selected mode of the camera.

Figure 9A:
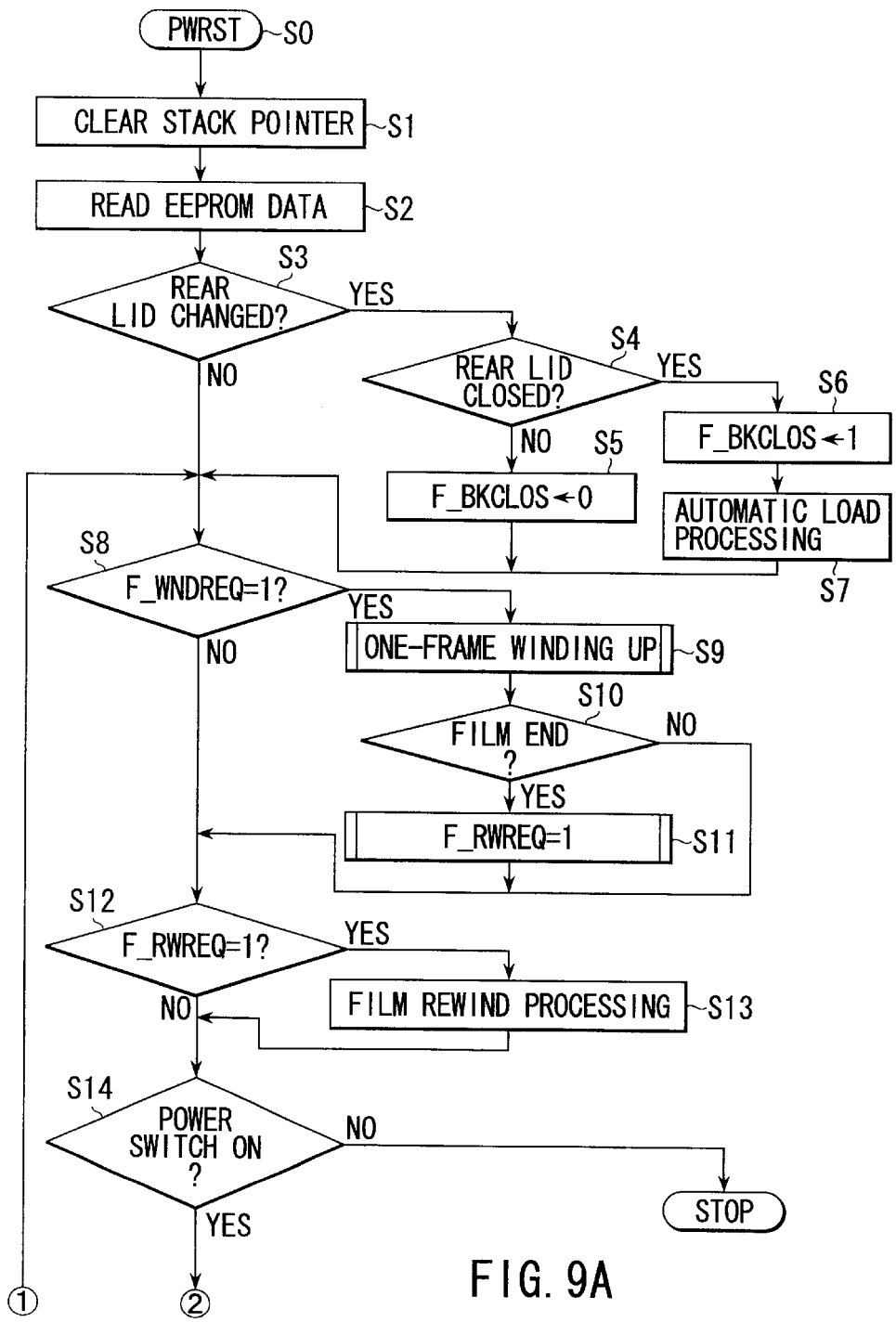
FIGS. 9A and 9B are flowcharts showing the main flow of the camera.
Figure 9B:
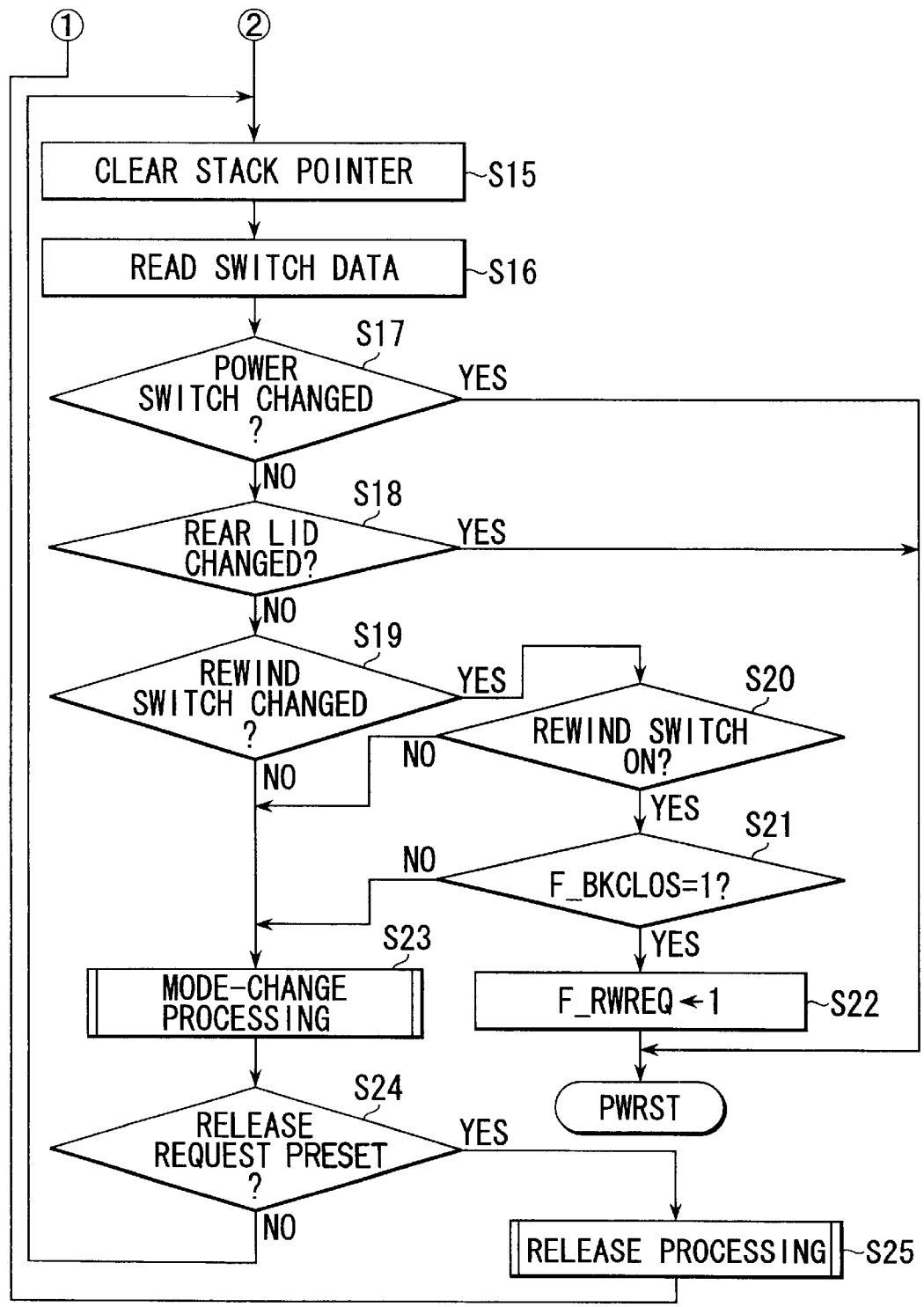

FIGS. 9A and 9B are flowcharts showing the main flow of the camera. When this flow is executed, a LCD window for a new specification has already been attached to the camera body, and corresponding switch segments have been turned ON by switch operation members.

A change at the power switch or cover switch causes an interruption, and processing is started from the step S0 (PWRST). In the step S1, a stack pointer is cleared to perform initialization of the stack level. Next, in the step S2, adjustment data necessary for control of the camera and/or data indicating the state of the camera is read from the EEPROM 204 and opened on the RAM.

Next, in the step S3, data concerning the state of open/close switch of the rear lid is read. The rear lid is fixed to the rear cover and is opened or closed in the case of insertion or detachment of the film cartridge respectively. If the open/close switch of the rear lid is changed, the processing flow goes to the step S4, and the open/close switch of the rear lid is not changed, the processing flow goes to the step S8. If it is judged that the rear lid is in a closed state based on the output of the open/close switch, the flow goes to the step S6. A flag F_BKCLOS is set to 1 in the step S6, and automatic load processing is carried out in the step S7. Then the flow goes to the step S8. The flag F_BKCLOS is a flag which is set to 0 when the rear lid is in an open state and 1 when the rear lid is in a closed state.

If the rear lid is in an open state in the step S4, the processing flow goes to the step S5 and the flag F_BKCLOS is set to 0. The flow then goes to the step S8, in which whether a flag F_WNDREQ is 1 or not is checked. If the flag F_WNDREQ is 0, the processing flow goes to the step S12. Otherwise, if the flag F_WNDREQ is 1, the flow goes to the step S9 of a sub-routine for winding up one frame. After the film is thus wound up by one frame, the flag F_WNDREQ is set to 0 and the processing flow goes to the step S10. In the step S10, whether the film has been wound up to the last frame (film end) is checked. If the last frame is not yet wound up, the flow goes to the step S12. Otherwise, if the last frame has been wound up, the processing flow goes to the step S11 and a flag F_RWDREQ is set to 1. Then, the flow goes to the step S12.

In the step S12, whether or not the flag F_RWDREQ is 1. If the flag F_RWDREQ is not 1, the processing flow goes to the step S14. Otherwise, if the flag F_RWDREQ is 1, the flow goes to the step S13 to rewind the film. After completion of rewinding of the film, the flag F_RWREQ is set to 0 and the processing flow goes to the step S14.

In the step S14, the state of the power switch of the camera is checked. If the power switch is ON, the processing flow goes to the step S15. Otherwise, if it is OFF, the routine ends. In the step S15, the stack pointer is cleared to initialize the stack level. In the step S16, data concerning the states of various switches of the camera is read. In the step S17, whether or not the power switch of the camera has changed is checked. If it has changed, the processing flow goes to PWRST. If the power switch is unchanged, the processing flow goes to the step S18.

In the step S18, whether or not the open/close state of the rear lid has changed is checked. If it has changed, the processing flow goes to PWRST. Otherwise, if it has not changed, the processing flow goes to the step S19. In the step S19, whether or not the rewind switch as a switch for rewinding the film has changed is checked. If it has not changed, the processing flow goes to the step S23. Otherwise, if it has changed, the processing flow goes to the step S20.

In the step S20, whether or not the rewind switch is ON is checked. If it is not ON, the processing flow goes to the step S23. Otherwise, if it is ON, the processing flow goes to the step S21. In the step S21, whether or not the flag F_BKCLOS is 1 is checked. If it is not 1, the processing flow goes to the step S23. Otherwise, if it is 1, the flow goes to the step S22. In the step 22, the flag F_RWREQ is set to 1, and the processing flow goes to PWRST.

In the step S23, the processing flow enters into a sub-routine for mode-change processing. Upon completion of the processing, the processing flow goes to the step S24. In the step S24, whether or not a release request described later has been made is checked. If a release request has been made, the processing flow goes to the step S25 of a sub-routine for release processing as photographing operation. Upon completion of the processing, the processing flow goes to the step S8. Otherwise, if no release request has been made, the processing flow goes to the step S15. The above is the main flow in the camera according to the present embodiment.

Figure 10A:
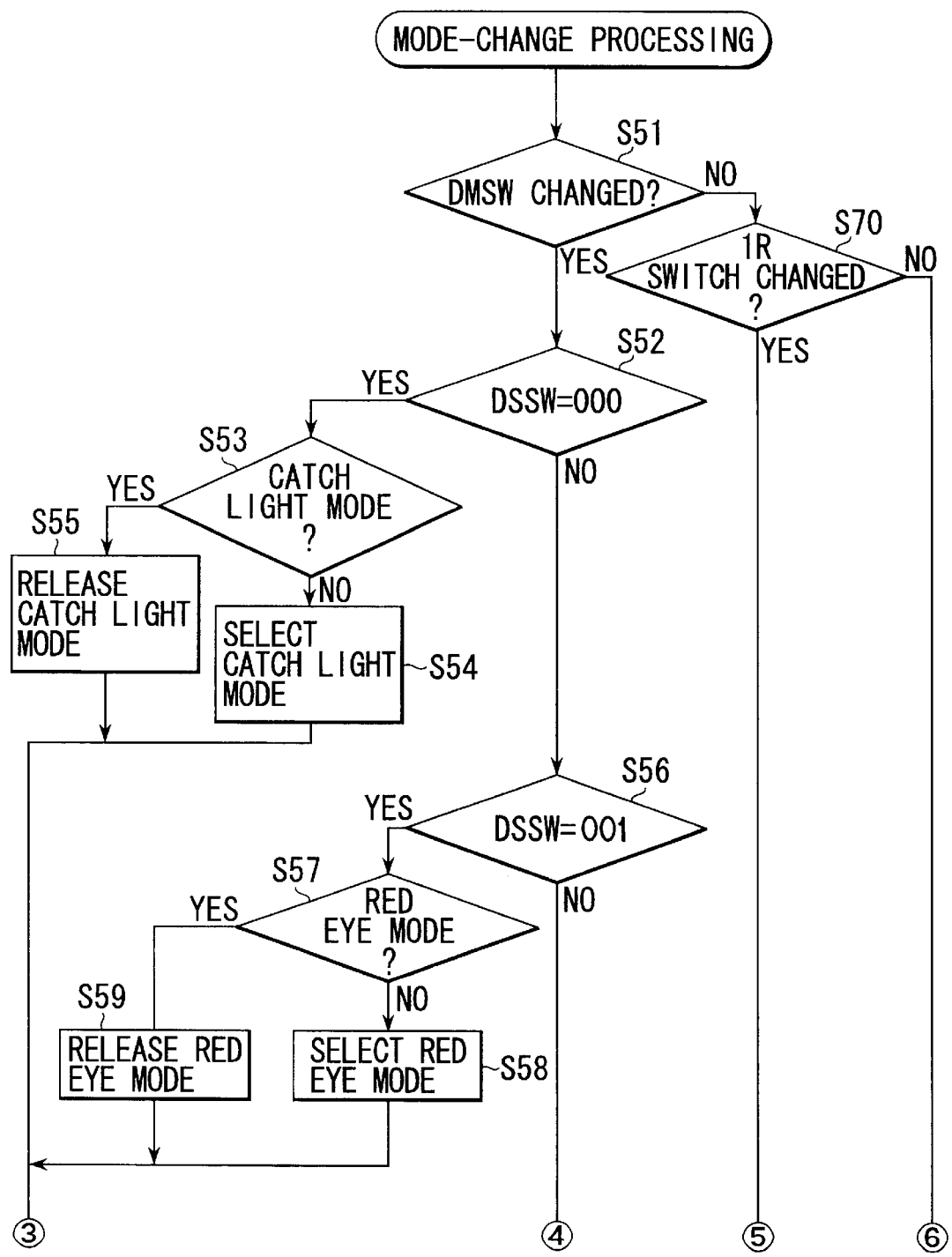
FIGS. 10A and 10B are flowcharts for explaining a sub-routine for the mode-change processing shown in FIGS. 9A and 9B.
Figure 10B:
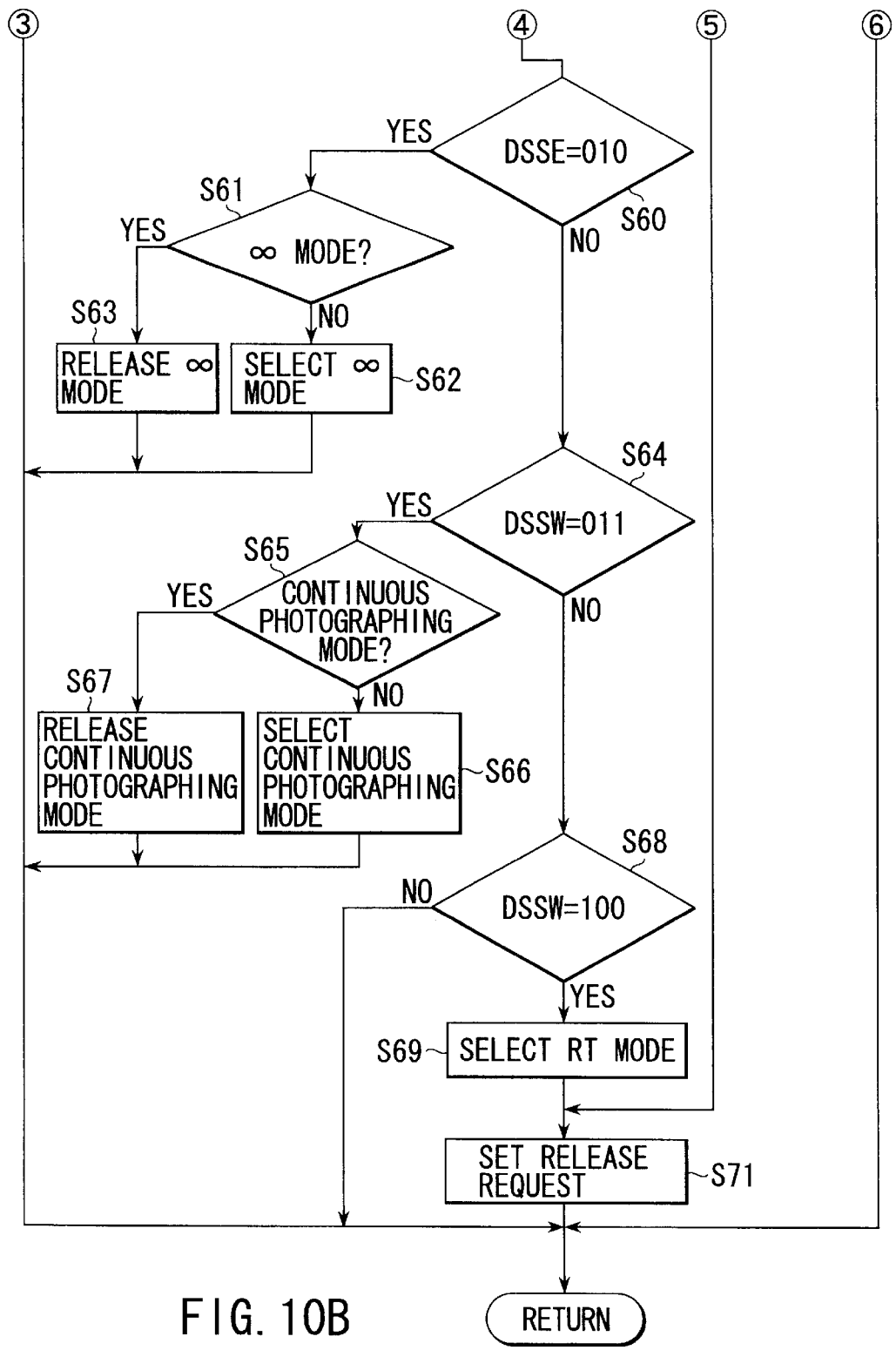

With reference to FIGS. 10A and 10B, explanation will now be made of the sub-routine for mode-change processing described above. The processing flow enters into the sub-routine for the mode-change processing in the step S23 in the main flow. Then, in the step S51, a check is made as to whether or not the DMSW (DM switch), which changes as the first mode setting button 150 is operated by user, has changed. If the DMSW has not changed, whether or not the first step (1R switch) of the release switch as a two-step switch has changed is checked in the step S70. If the 1R switch has changed, the processing flow goes to the step S71. Otherwise, the processing returns to the main flow.

If the DMSW has changed in the step S51, the processing flow goes to the step S52 to check whether or not the states of the SW1 to SW3 for setting the specification indicate DSSW=000. DSSW=000 means that a catch light mode is added to the specification of the camera. If DSSW=000 is set, the processing flow goes to the step S53. If not, the processing flow goes to the step S56. In the step S53, whether or not the camera is currently in the catch light mode is checked. If not, the catch light mode is selected in the step S54. If the camera is in the catch light mode, the catch light mode is released in the step S55, and the processing returns to the main flow.

In the step S56, whether or not DSSW=001 is set is checked. If DSSW=001 is set, it means that the specification of the camera is added with an ability to select the red eye mode when emitting flash light if necessary. If DSSW=001 is set, the processing flow goes to the step S57. Otherwise, if DSSW=001 is not set, the processing flow goes to the step S60. In the step S57, whether or not the red-eye reduction mode is currently set is checked. If the red-eye reduction mode is not set, the red-eye reduction mode is selected in the step S58 and the processing returns to the main flow. If the camera is in the red-eye reduction mode, the red-eye reduction mode is released in the step S59, and thereafter, the processing returns to the main flow.

In the step S60, whether DSSW=010 is set is checked. If DSSW=010 is set, it means that the specification of the camera is added with the infinity mode in which the focus adjustment can be set to infinity if necessary. If DSSW=010 is thus set, the processing flow goes to the step S61. If not, the processing flow goes to the step S64. In the step S61, whether or not the infinity ($\infty$) mode is currently set is checked. If the camera is not in the infinity mode, the infinity mode is selected in the step S62, and the processing returns to the main flow. If the camera is in the infinity mode, the infinity mode is released in the step S63 and the processing returns to the main flow.

In the step S64, whether or not DSSW=011 is set is checked. If DSSW=011 is set, it means that the specification of the camera is added with the continuous photographing mode which enables continuous photographing if necessary. If the DSSW=011 is thus set, the processing flow goes to the step S65. If not, the processing goes to the step S68. In the step S65, whether or not the continuous photographing mode is currently set is checked. If it is not set, the continuous photographing mode is selected in the step S66 and the processing returns to the main flow. If the continuous photographing mode is currently set, this mode is released in the step S67 and the processing returns to the main flow.

In the step S68, whether or not DSSW=100 is set is checked. If DSSW=100 is set, it means that the specification of the camera is added with the real-time release mode (RT mode) which reduces the release time lag if necessary. If the DSSW=100 is not set, the processing flow directly returns to the main flow. If DSSW=100 is set, the processing goes to the step S69. In the step S69, the RT mode is selected and the processing flows goes to the step S71. In the step S71, a release request is set, and thereafter, the processing returns to the main flow. This is the sub-routine for mode-change processing.

Figure 11A:
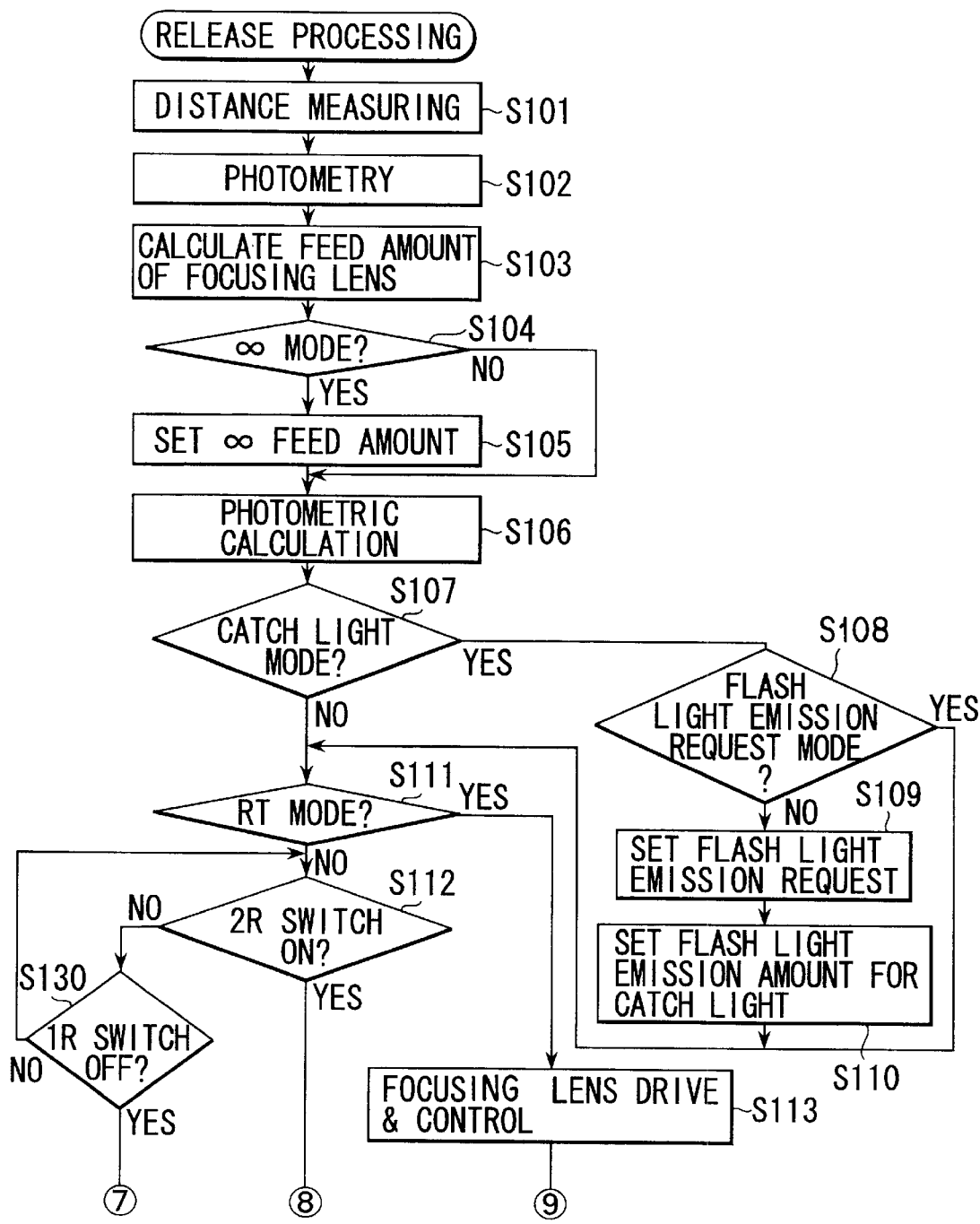
FIGS. 11A and 11B are flowcharts for explaining a sub-routine for the release processing shown in FIGS. 9A and 9B.
Figure 11B:
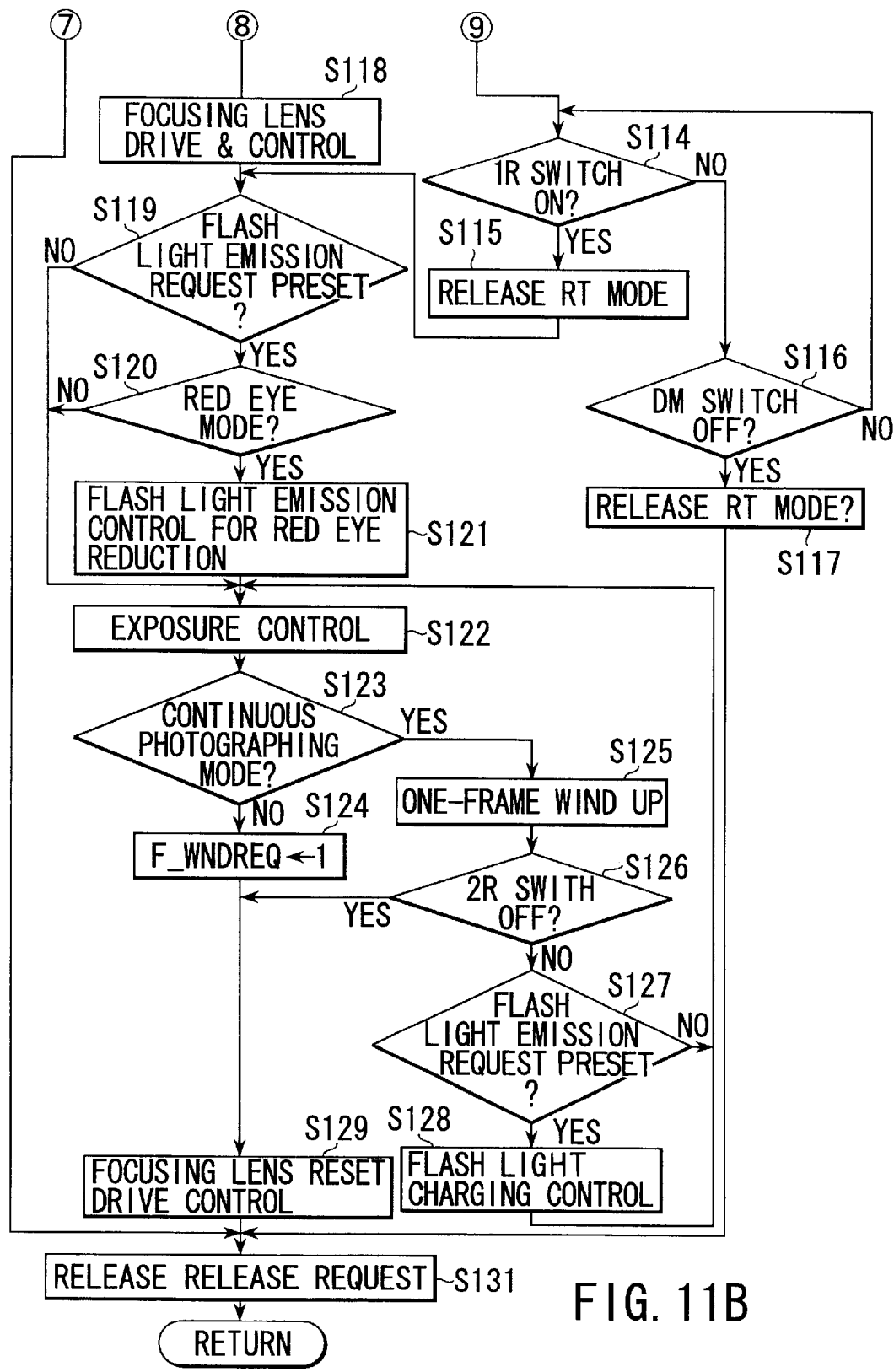

Next, the sub-routine for the release processing described above will be explained with reference to FIGS. 11A and 11B. If the processing enters into the sub-routine for the release processing in the step S25 in the main flow, the distance to an object is measured in the step S101, and the processing goes to the step S102. In the step S102, the brightness of the object is measured. The processing then goes to the step S103. In the step S103, the feed amount of the focusing lens is calculated for focus adjustment, based on the measurement result in the step S101. The processing flow then goes to the step S104. In the step S104, whether or not the infinity mode is currently set is checked. If the infinity mode is currently set, the processing flow goes to the step S105. If not, the flow goes to the step S106.

In the step S105, the feed amount of the focusing lens is set to focus on the infinity object. In the step S106, photometric calculation is carried out for shutter control, based on the measurement result in the step S102. If necessary, a flash light emission request is set. The processing flow then goes to the step S107. In the step S107, whether or not the catch light mode is currently set is checked. If this mode is currently set, the processing flow goes to the step S108. If not, the processing flow goes to the step S111. In the step S108, whether or not the flash light emission request is currently set is checked. If the flash light emission request has been set, the processing flow goes to the step S111. If not, the processing flow goes to the step S109. In the step S109, a flash light emission request is set, and the processing then goes to the step S110. In the step S110, the flash light emission amount is set for the catch light, and the processing flow goes to the step S111.

In the step S111, whether or not the RT mode is currently set is checked. If the RT mode is not currently set, the processing flow goes to the step S112. If the RT mode is currently set, the processing flow goes to the step S113. In the step S113, the focusing lens is driven and controlled, based on the focusing lens feed amount calculated in the step S103. The processing flow then goes to the step S114. In the step S114, whether or not the 1R switch is ON is checked. If it is ON, the RT mode is released in the step S115, and the processing flow then goes to the step S119. If the 1R switch is not ON in the step S114, the processing flow goes to the step S116, and whether or not the DM switch is OFF is checked. If the DM switch is OFF, the RT mode is released in the step S117, and the processing flow then goes to the step S131. If it is not OFF, the processing flow goes to the step S114.

Meanwhile, in the step S112, whether or not the switch (2R switch) in the second step of the release switch as a two-step switch is ON is checked. If it is not ON, the processing flow goes to the step S130. If it is ON, the processing flow goes to the step S118. In the step S130, whether or not the 1R switch is OFF is checked. If it is not OFF, the processing flow returns to the step S112. Otherwise, if it is OFF, the processing flow goes to the step S131.

In the step S118, the focusing lens is driven and controlled, based on the focusing feed amount calculation in the step S103. Particularly, in the infinity mode, the focusing lens is driven, based on the infinite feed amount in the step S105. The processing flow goes then to the step S119.

In the step S119, whether or not the flash light emission request has been set is checked. If it has not been set, the processing flow then goes to the step S122. If it has been set, the processing flow goes to the step S120. In the step S120, whether or not the red-eye mode is currently set is checked. If it is not currently set, the processing flow goes to the step S122. If the red-eye mode is currently set, flash light emission control is carried out to reduce the red-eye effect in the step S121, and the processing flow goes to the step S122.

In the step S122, on the basis on the photometric calculation result in the step S106, the shutter is opened/closed and the flash light is emitted if a flash light emission request has been set, thus performing exposure. If the catch light mode is currently set, the light emission of the flash is controlled, based on the light emission amount for the catch light mode, which has been set in the step S110. Upon completion of a series of exposure control in the step S122, whether or not the continuous photographing mode is currently set is checked in the step S123. If the continuous photographing mode is not currently set, the flag F_WNDREQ is set to 1 in the step S124, and the processing flow goes to the step S129. If this mode is currently set in the step S123, the processing flow goes to the step S125, and operation of winding up one frame is carried out. The processing flow then goes to the step S126.

In the step S126, whether or not the 2R switch is OFF is checked. If it is OFF, the processing flow goes to the step S129. Otherwise, if it is not OFF, the processing goes to the step S127. In the step S127, whether or not a flash light emission request has been set is checked. If it is not set, the processing flow returns again to the step S122 and exposure control is carried out again. If it is confirmed, in the step S127, that a flash light emission request has been set, charging control of a capacitor used for flash light emission is performed in the step S128 as required for flash light emission. Thereafter, the processing flow returns to the step S122, and exposure control is carried out again.

In the step S129, the focusing lens which has been driven in the step S118 (or driven in the step S113 if the real-time release mode is set) is reset driven. The processing flow then goes to the step S131. In the step S131, a release request is released and the processing flow returns to the step S8 in the main flow. This is the sub-routine for the release processing.

The catch light mode, real-time release mode, red-eye reduction mode, and the continuous photographing mode will now be explained.

(1) Catch Light Mode

As an image creation effect, there is a case that light is illuminated on pupils of a target person or the like by a reflector or the like regardless of the object luminance, to obtain an image which appears as if the person's pupils shone when taking a picture of a man or the like is photographed. In case of the present embodiment, this effect can be obtained by lightening the flash in the catch light mode regardless of the result of photometric calculation. However, if the flash is lightened when the object luminance is high, the finished picture will be exposed too much. Therefore, the flash light emission amount is set to a level which does not influence on the exposure, in the present embodiment. In addition, this image creation effect can be obtained if only the flash emits light. Therefore, if the object luminance is so low that the flash must emit light, the flash need only to emit light such that proper exposure is achieved as usual.

(2) Real-Time Release Mode

Normally, a camera executes photographing preparatory operations such as a distance-measuring operation, photometric operation, and the like with respect to an object, after its 1R switch is turned ON. If its 2R switch is turned ON thereafter, the focusing lens feed control is executed to adjust the focus, and then, actual photographing is carried out. In this method, however, various operations are performed after the switch is operated to begin photographing.

Therefore, more or less, a time difference (release time lag) exists from the operation of the switch to the actual photographing. Hence, in the real-time release mode, the above-mentioned preparations for photographing are carried out during operation of transiting to the real-time release mode, in order to shorten the release time lag. After the 1R switch is turned ON, only exposure control as an actual photographing operation is carried out. In the present embodiment, this real-time release mode is set at the time of turning-ON of the switch as a transit operation to this real-time release mode, and the normal mode is set when the switch is OFF. That is, photographing is executed in the real-time release mode by turning ON the 1R switch with the switch kept.

(3) Red-Eye Reduction Mode

If a person is photographed with the flash used in the night time when it is dark, the pupils are photographed in red, i.e., a so-called red-eye phenomenon occurs. This is because pupils are opened in dark places and retinas reflect the light if strong light is irradiated thereon. In a method generally used to reduce this phenomenon, light is irradiated to the object before photographing so that pupils are closed. Also, in the present embodiment, the flash is lightened before photographing to reduce the red-eye phenomenon, according to a known method.

(4) Continuous Photographing Mode

In general, photographing with a camera is normally carried out once upon one release operation. However, there is a case that a user wishes to photograph continuously while the release switch is ON. Hence, in the present embodiment, photographing can be carried out continuously by keeping the release switch (2R switch) ON in the continuous photographing mode.

Second Embodiment

Figure 12:
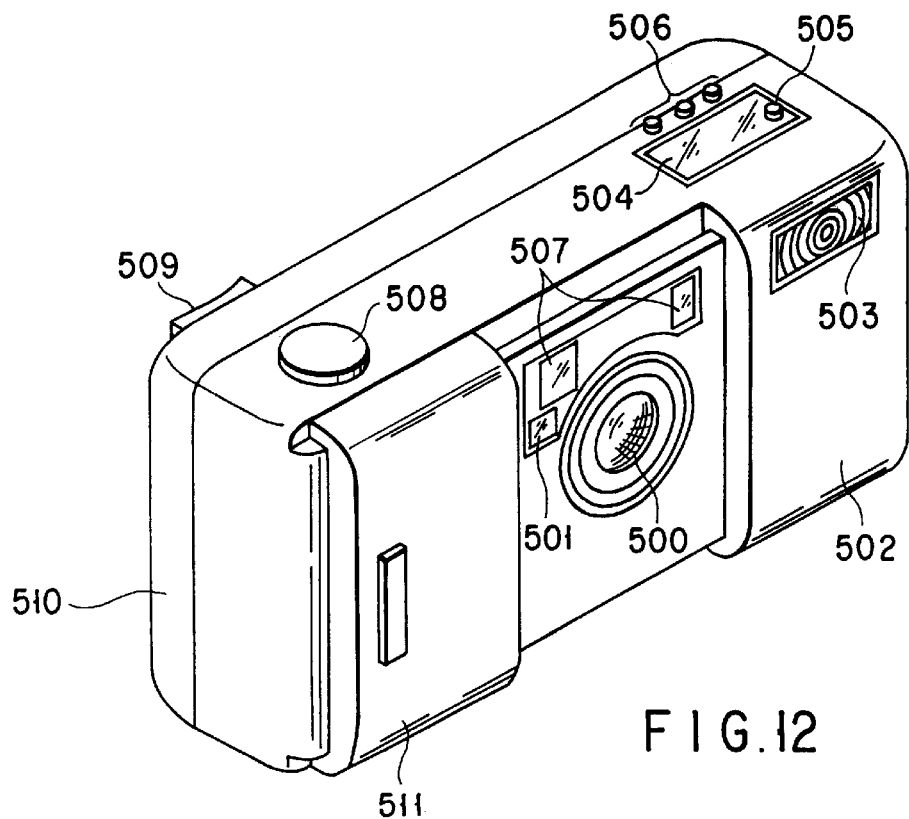
FIG. 12 is an outer perspective view of a camera to which the second embodiment of the present invention is applied.

Next, the second embodiment of the present invention will be explained. FIG. 12 is an outer perspective view of a camera to which the second embodiment of the present invention is applied. As shown in FIG. 12, a photographing lens barrel 500 is provided at the center section on the front surface of the camera. Distance-measuring windows 507 are provided above the barrel 500. A finder objective window 501 is provided adjacent to the one of the distance-measuring windows 507. In addition, a barrier 511 is provided to protect the photographing lens barrel 500, finder objective window 501, and distance-measuring windows 507. Further, a flashing light emission window 503 is provided in the right-hand side of the front surface of the camera.

In addition, a release button 508 is provided in the left-hand side of an upper section of the camera, and a LCD (Liquid Crystal Display) window (specification-variable member) 504 is provided in the right-hand side of the upper section. Second mode setting buttons 506 are provided at a peripheral section of the LCD window 504, and a first mode setting button 505 is provided inside the LCD window 504. The second mode setting buttons 506 are a button used to set a mode used for specification common to all cameras. The first mode setting button 505 is a button to set a mode for adding a specification to the camera by replacing the LCD window 504. Further, a zoom lever 509 is provided on the back surface of the camera. Front and rear covers 502 and 510 construct the exterior surfaces of the camera body.

Figure 13:
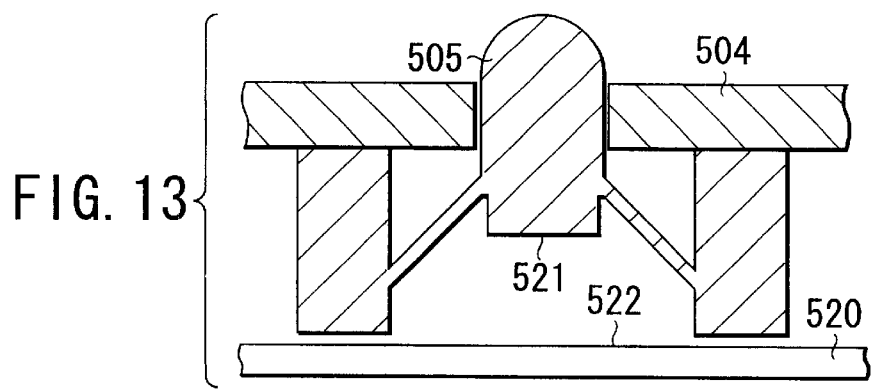
FIG. 13 is a cross-sectional view showing a first mode-setting button 505 and its periphery.

FIG. 13 is a cross-sectional view showing the first mode setting button 505 and the periphery thereof. When a user presses the first mode setting button 505, the first mode setting button 505 is pushed down so that a conductive section 521 provided at its bottom section contacts a pattern 522 for the first mode setting button, which is comprised of two adjacent patterns provided on a main board 520, thereby rendering the two patterns conductive. When the first mode setting button 505 is released, the button recovers the original position.

Figure 14:
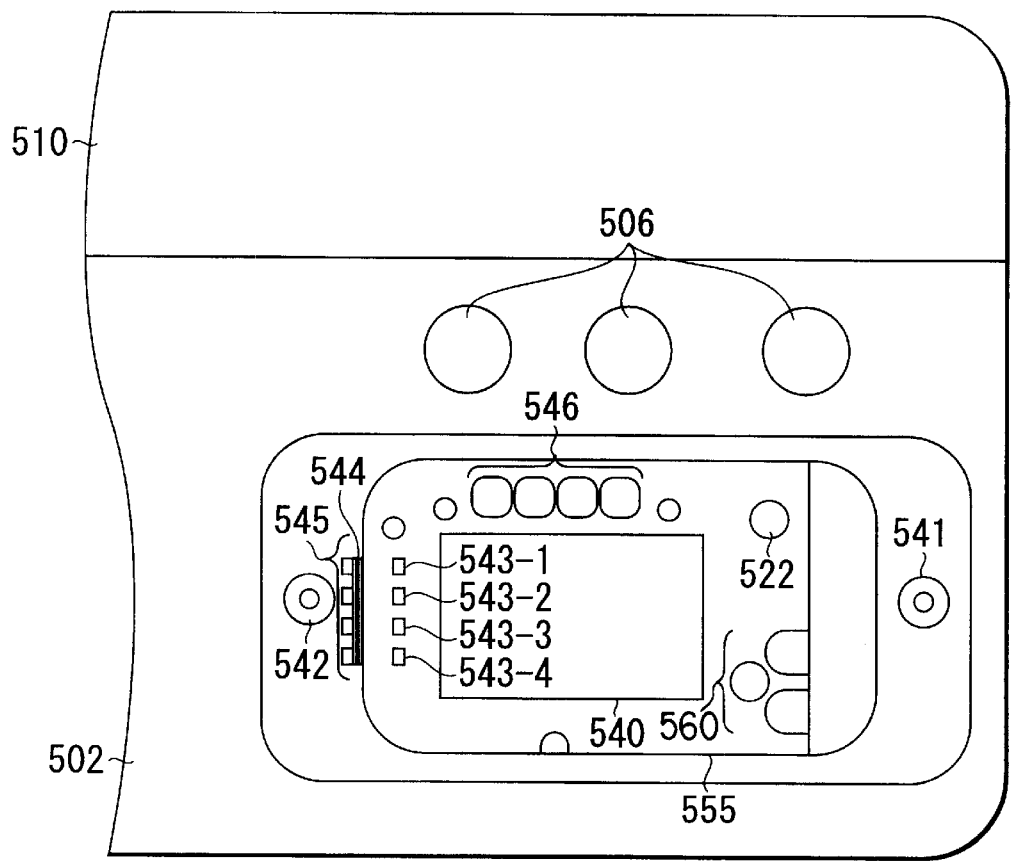
FIG. 14 is a view showing the upper section of the camera where the LCD window 504 is detached.

FIG. 14 is a view showing the upper section of the camera, where the LCD window is detached. Exposed through an opening section 555 provided in the front cover 502 as an exterior member are the first mode setting button pattern 522, check lands 546, 560, contact points 542-1 to 543-4 for GND and SW1 to SW3, LCD 540, and the like provided on the main board (electric board). The check lands 546, 560, enable communication between the CPU and external devices and are provided near the LCD 540.

In the periphery of the opening section 555, screw bosses 541 and 542 are provided to attach the LCD window 504. Further, a segment recess (segment hold section) 545 and a short bar 544 are provided adjacent to the screw boss 542. The short bar 544 serves as a conductive member which renders segments conductive to each other.

Figure 15:
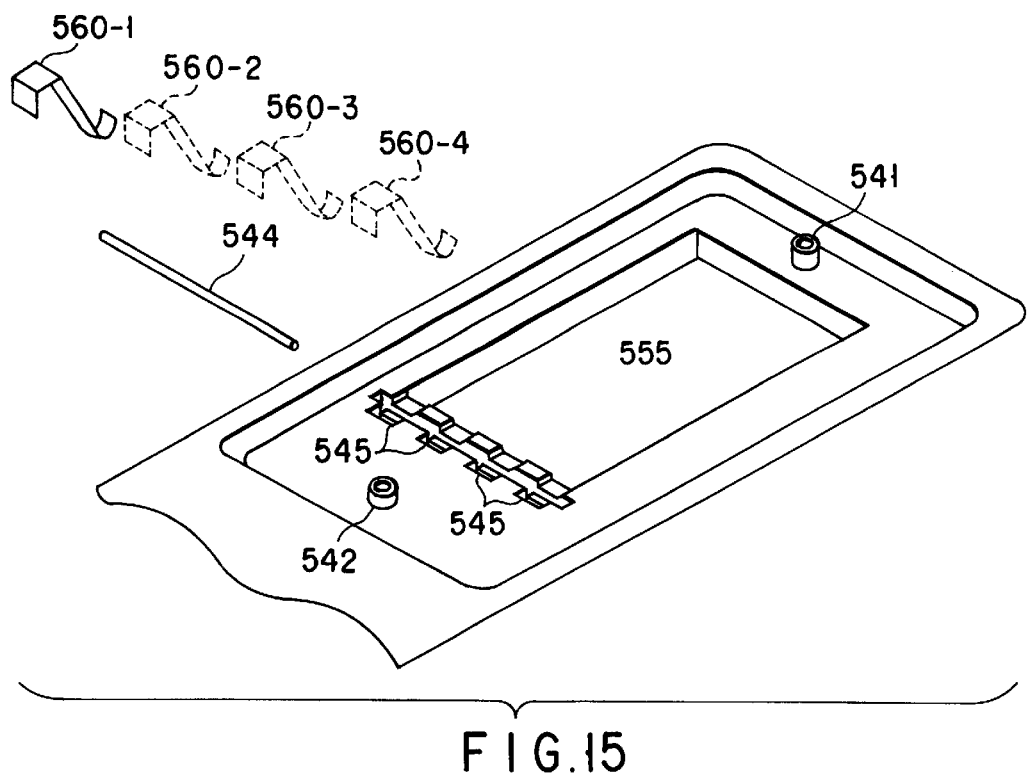
FIG. 15 is a view showing the upper section of the camera where a main board is removed, and shapes of a GND segment 560-1, SW1 to SW3 segments 560-2 to 560-4, and a short bar 544.

FIG. 15 shows the state of the upper section of the camera when the LCD window is detached and also shows the shapes of the switch segments (560-1 for GND and 560-2 to 560-4 for SW1 to SW3) and the short bar 544, as switch operation members to be installed on the segment recess section 545.

Figure 16A:
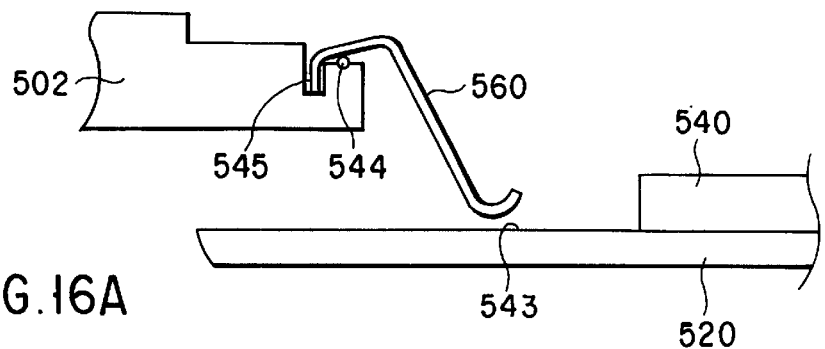
FIGS. 16A and 16B are views showing states where the GND segment 560-1, SW1 to SW3 segments 560-2 to 560-4, and short bar 544 are attached to a segment recess section 545.
Figure 16B:
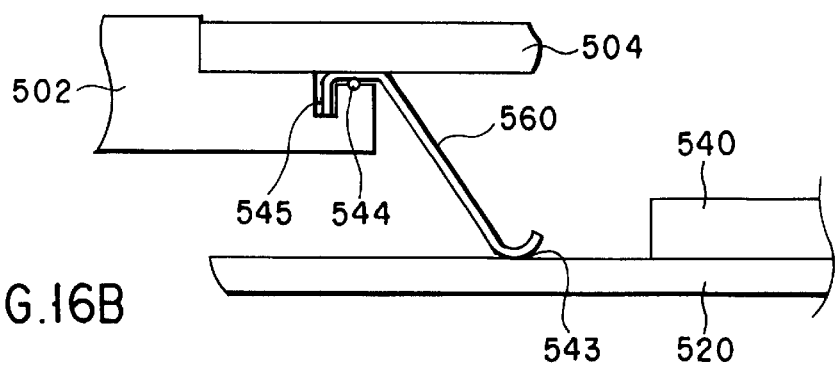

FIGS. 16A and 16B are views showing state where the GND segment 560-1, SW1 to SW3 segments 560-2 to 560-4, and short bar 544 are attached to the segment recess section 545. After the short bar 544 is attached as shown in FIG. 16A, the GND segment 560-1 and the SW1 to SW3 segments 560-2 to 560-4 are inserted in the segment recess section 545 in the front cover 502. Next, the LCD window 504 is engaged in a concave section of the front cover 502. The segments 560 are pressed down from the upside, so that ends of the segments 560 are fixed by the segment recess section 545, and the other ends are fixed in contact with the contact points 543 on the main board 520. In addition, the short bar 544 is pressed from the upside by the segments 560 and is thus fixed.

When the LCD window 504 is kept thus provided, it covers the LCD 540 and the segment recess section 545 and thus serves as a protection panel. An area of the LCD window 504 that corresponds to the LCD 540 has a light-transmissible property to enable observation, and areas thereof that cover the segment recess section 545, contact points 543, and check lands 546 have a light-shielding property to disable observation.

In the present embodiment, the GND segment 560-1 is always selected while any of the SW1 to SW3 segments 560-2 to 560-4 that are selected and attached in accordance with the camera specification.

Figure 17:
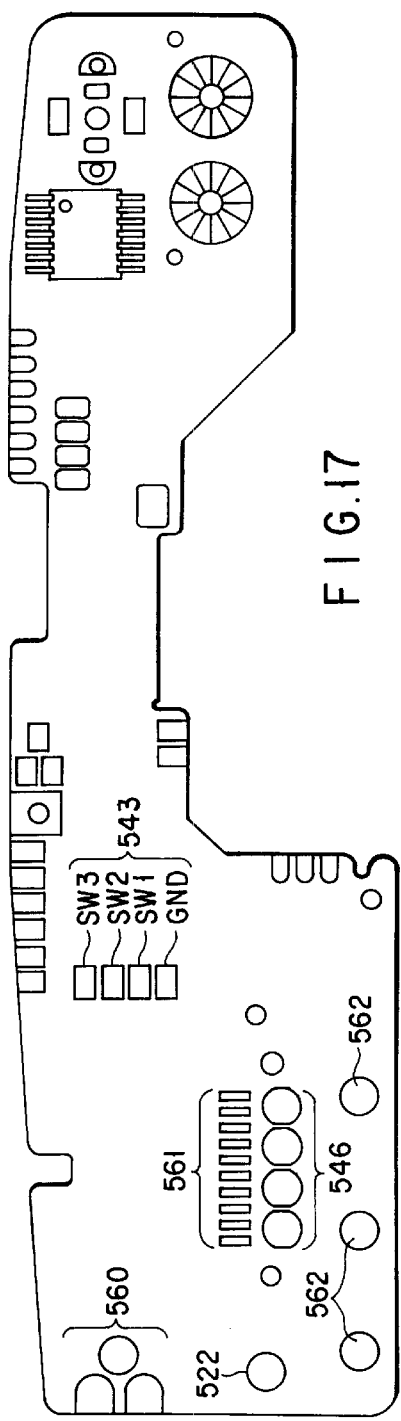
FIG. 17 is a view showing the surface of the main board 520.

FIG. 17 shows the surface of the main board 520. Provided on the main board surface are the first mode setting button pattern 522, second mode setting button patterns 562, contact points 543 contactable with the GND and SW1 to SW3 segments, and check lands 560 and 546 and LCD land 561 for communicating with a CPU, as shown in FIG. 17.

Figure 18:
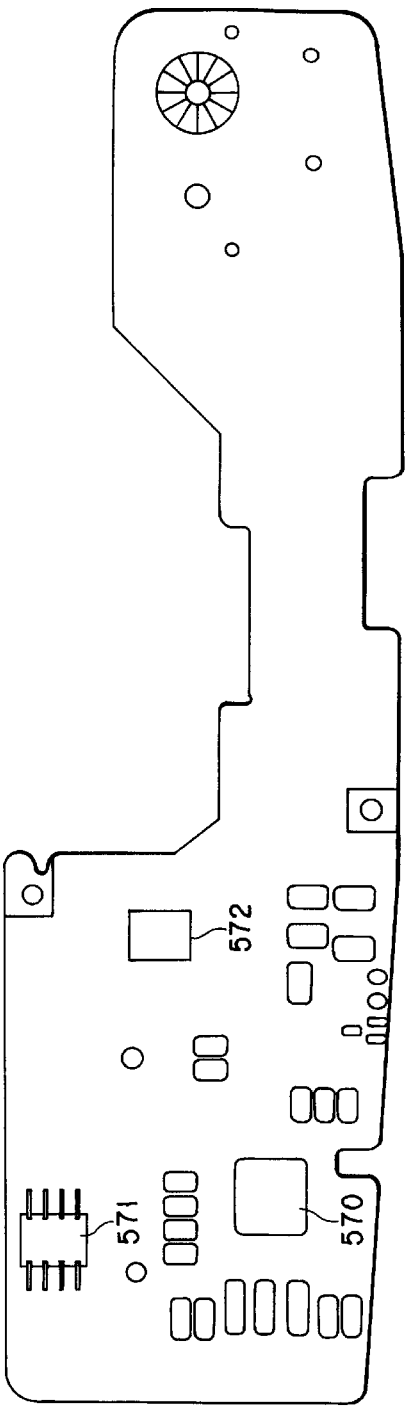
FIG. 18 is a view showing the back surface of the main board 520.

FIG. 18 shows the back surface of the main board 520. Provided on the backs surface of the board are a CPU 570, an EEPROM 571 storing adjustment values for the camera, an interface IC (IFIC) for making communication between the CPU 570 and respective sections to control respective sections of the camera, and the like, as shown in FIG. 18.

Figure 19:
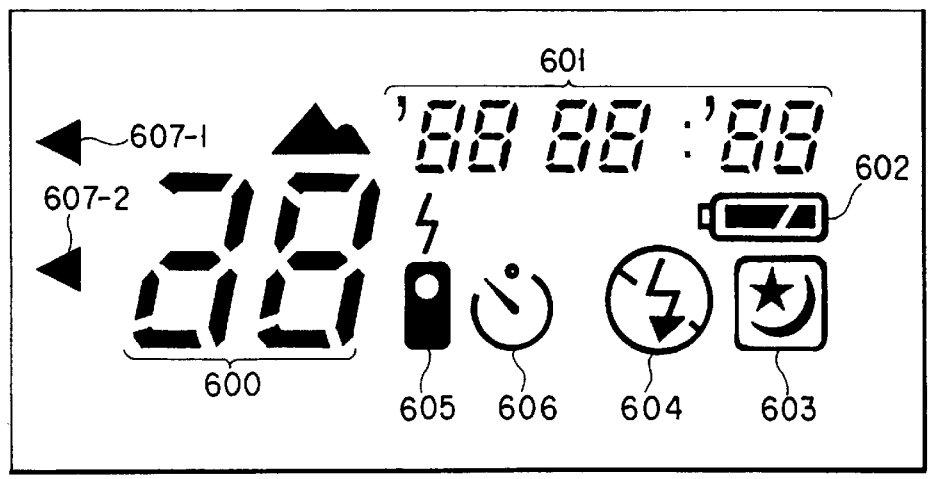
FIG. 19 is a view showing a display example of a LCD display section according to the second embodiment of the present invention.

FIG. 19 shows a display example of the LCD display circuit according to the second embodiment of the present invention. FIG. 19 shows a state where all segments are indicated. In the second embodiment, mode indication segments for the infinity mode (∞), real-time release mode (RT), continuous photographing mode, catch light mode (CL), and red-eye mode that are used in the first embodiment are removed to save the number of segments. Segments of remote control 605, self 606, flash 604, and night view 603 are provided for mode indication of the camera. The segment 600 indicates the number of frames. The segment 601 indicates the date, and the segment 602 indicates the battery level. The segments 607-1 and 607-2 are lightened in accordance with the mode selected by operating the first mode setting button. When the second mode setting button is pressed, the segments of the remote control 605, self 606, flash 604, and night view 603 are lightened upon necessity.

Figure 20:
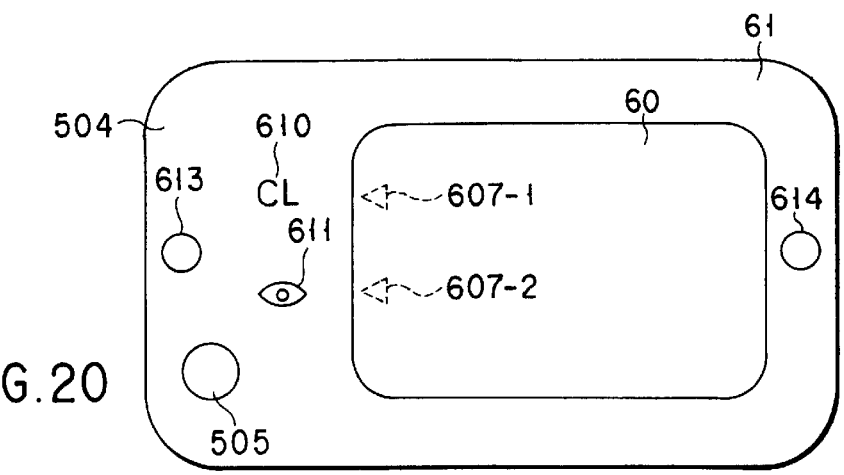
FIG. 20 is a view for explaining the LCD display where the camera is set in the first specification in which a catch-light mode and a red-eye mode are combined together.

FIG. 20 is a view for explaining the LCD display in case where the first specification combining the catch-light (CL) mode and the red-eye reduction mode is set. Display signs 610 and 611 of the catch-light (CL) mode and the red-eye reduction mode are respectively printed on those sections of the LCD window 504 fixed by screws 613 and 614 that are adjacent to the segments 607-1 and 607-2. When a user pushes once the first mode setting button 505, the segment 607-1 is lightened to indicate that the catch-light (CL) mode is set. When the user pushes once more the button, the segment 607-2 is lightened to indicate that the red-eye reduction mode is set. When a user pushes further once more the button, the mode is set off.

Figure 21:
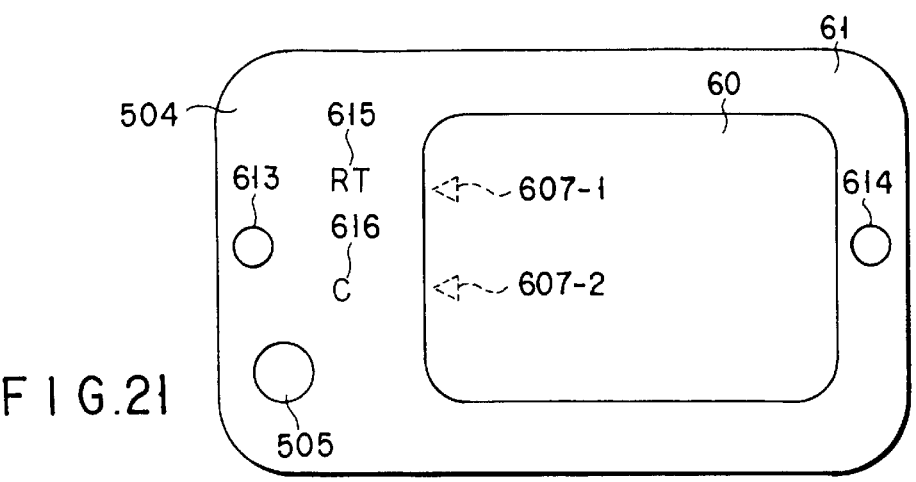
FIG. 21 is a view for explaining the LCD display where the camera is set in the second specification in which a real-time release mode and a continuous photographing mode are combined together.

FIG. 21 is a view for explaining the LCD display in case where the second specification combining the real-time release mode and the continuous photographing mode is selected. Display signs 615 and 616 of the real-time release mode and the continuous photographing mode are respectively printed on those sections of the LCD window 504 fixed by screws 613 and 614 that are adjacent to the segments 607-1 and 607-2. When a user pushes once the first mode setting button 505, the segment 607-1 is lightened to indicate that the real-time release mode is set. When the user pushes once more the button, the segment 607-2 is lightened to indicate that the continuous photographing mode is set. When the user pushes further once more the button, the mode is set off.

In the FIGS. 21 and 22, the portion indicated by reference numeral 60 is a light-transmissible area, and the portion indicated by reference numeral 61 is a light-shielding area.

FIG. 22 is a view showing a modification example of electric segments. This modification example uses segments 700-1 to 700-4 which respectively have notches 710-1 to 710-4 cut at their bottoms. Except for those segments that are used in accordance with the specification of the camera, unnecessary segments are bent at the notches and thereby cut out.

The mode change processing of the CPU in the second embodiment is the same as that of the mode change processing explained in the first embodiment, and therefore, explanation thereof will be omitted herefrom.

FIG. 23 is a view showing a modification example of the installation position of the LCD window. A photographing lens barrel 801 is provided on the front surface of a camera body 800, and a release button 803 is provided at an upper section. In addition, an ocular window 802 is provided at an upper section in the center of the back surface of the camera, and a LCD window 807 is fixed to the camera body 800 below the window 802 by screws 806 and 808. A first mode setting button 804 is provided inside the LCD window 807, and a second mode setting button 805 is provided outside the LCD window 807.

According to the first and second embodiments described above, a component (LCD window) which can be easily attached/detached as a specification-change member to/from the upper surface or the back surface of the exterior of a camera, which is the place normally used for display. Therefore, the specification of the camera can be changed with a simple structure and a simple operation. The LCD window is arranged facing a main board where a CPU for controlling the camera is installed. When the LCD window is attached, a plurality of switches are selectively rendered conductive thereby to inform users of a specification change without using a complicated structure.

In the first embodiment, display signs for not only modes used in accordance with the specification but also modes not used are provided in a liquid crystal display (LCD) board. Therefore, the specification of the camera can be changed merely by changing switch operation members. In addition, the first embodiment enables a specification change with one single LCD window by making the switch operation members such that these members can be simply inserted and detached. Alternatively, the switch operation member may be formed to be integral with the LCD window.

Further, according to the second embodiment, geometric marks are provided as display signs for modes according to a specification change. The mode according to a specification change is displayed in form of a figure, characters, or the like corresponding to a geometric mark. Thus, the LCD is prevented from being enlarged while the camera is downsized. In the second embodiment, the LCD window as a specification-change member is provided with an operation section for selecting the mode according to a specification change. However, it is possible to add further another specification if the LCD window were not provided the operation section for selecting a mode.

Still further, when the specification-change member, which is easily detachable, is removed, the check lands for communicating with the CPU of the camera are exposed, thereby enabling various adjustments concerning the camera easily.

Still further, since the specification change can be achieved by easily services, a plurality of components for changing the specification may be supplied to camera shops, and users may be allowed to select a desired specification on the spot. The components may then be assembled there.

According to the present invention, it is possible to provide a camera which enables selection from a plurality of specifications with a simple structure and easy operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera capable of changing a specification, comprising:
    a plurality of switches;
    a specification-change member for rendering a predetermined combination of the plurality of switches conductive;
    an operation member for selecting a mode of the camera;
    a detection switch for detecting an operation on the operation member; and
    control means for confirming conducting states of the plurality of switches and setting the mode of the camera in correspondence with a result of the confirmation, each time an output is obtained from the detection switch,
    wherein the control means is compatible with a plurality of specifications, and the specification of the camera can be changed by changing a combination of conducting switches among the plurality of switches.

2. A camera according to claim 1, wherein the specification-change member has switch operation projections which respectively render the plurality of switches conductive.

3. A camera according to claim 1, wherein the specification-change member has a plurality of operation member installation sections where switch operation members which render respectively the plurality of switches conductive can be attached, and the plurality of switch operation members selected in a predetermined combination are attached to the plurality of operation member installation switches, so that the plurality of switches in a predetermined combination are rendered conductive.

4. A camera according to claim 1, further comprising a display element capable of displaying the selected mode, wherein the specification-change member is provided so as to cover the display element.

5. A camera according to claim 4, further comprising:
    an electric board including the plurality of switches and the control means; and
    a communication land for enabling communication between the control means and an external device,
    wherein the communication land is provided near the display element on the electric board, and is exposed when the specification-change means is detached.

6. A camera capable of changing a specification, comprising:
    a plurality of contact points;
    a plurality of segment hold sections capable of holding a plurality of segments capable of contacting the plurality of contact points;
    a conductive member by which those segments among the segments that are attached in a predetermined combination to the plurality of segment holding sections can be rendered conductive;
    an operation member for selecting a mode of the camera;
    a detection switch for detecting an operation of the operation member; and
    control means for confirming conducting states of conductions between the plurality of contact points and the plurality of segments and setting the mode of the camera in correspondence with a result of the confirmation, each time an output is obtained from the detection switch,
    wherein the control means is compatible with a plurality of specifications, and a desired specification is obtained by selecting a segment or segments to be attached to the plurality of segment holding sections.

7. A camera according to claim 6, further comprising:
    a display element capable of displaying the mode of the camera; and
    a protection panel which covers the display element and the segment holding sections, wherein
        an area of the protection panel that corresponds to the display element has a light-transmissible property and an area of the protection panel that covers the segment holding section has a light-shielding property.

8. A camera according to claim 7, wherein the operation member is attached to the protection panel.

9. A camera according to claim 6, further comprising:
    an electric board having a plurality of communication lands, the control means, and the plurality of contact points, the plurality of communication lands provided near the plurality of contact points so as to enable communication between the control means and an external device;
    a camera exterior member having an opening section for exposing the plurality of contact points and the plurality of communication lands; and
    a protection member provided so as to cover an opening section provided in the camera exterior member.

10. A camera according to claim 9, wherein the plurality of segment holding sections are provided near the opening section of the camera exterior member and covered by the protection member.

11. A camera according to claim 10, wherein with the protection member attached to the opening section of the camera exterior member, the segments installed on the plurality of segment holding sections are pressed by the protection member, thereby making contact with the plurality of contact points.

12. A camera capable of changing a specification, comprising:
   a specification setting switch including a plurality of switches;
   a specification-change member for turning ON/OFF the plurality of switches of the specification-setting switch in a predetermined combination;
   an operation member for selecting a mode of the camera;
   a mode selection switch for detecting an operation on the operation member; and
   control means for confirming a combination of ON/OFF states of the specification-setting switch and determining the mode of the camera based on a result of the confirmation, each time an output is obtained from the mode selection switch,
   wherein the control means is compatible with a plurality of specifications, and the specification of the camera is changed by changing the combination of ON/OFF states of the plurality of switches.

13. A camera according to claim 12, further comprising:
   an electric board provided with the specification-setting switch, the control means, and communication lands provided near the specification-setting switch so that an external device communicates with the control means;
   a camera exterior member having an opening section where the specification-setting switch and the communication lands are exposed;
   a specification-change member installation section formed around the opening section of the camera exterior member, where the specification-change member is attached; and
   a display element provided on the electric board and exposed from the opening section of the camera exterior member, wherein
      the specification-change member has a light-transmissible section where the display element can be observed and a light-shielding section which disables observation of the specification-setting switch and the communication lands.

14. A camera according to claim 13, wherein the operation member is attached to the specification-change member.

15. A camera according to claim 13, wherein the specification-change member has a display section for indicating the specification of the camera.

16. A camera according to claim 13, wherein the specification-change member has a plurality of operation member installation sections where operation members respectively capable of operating the plurality of switches of the specification-setting switch are installed, and the plurality of switches are turned ON/OFF in a predetermined combination by installing the operation members to any predetermined one or ones of the operation member installation sections.

17. A camera capable of changing a specification, comprising:
   a plurality of contact points;
   a segment having a plurality of contact sections respectively contactable with the plurality of contact points, and a connection section where the plurality of contact sections are connected together;
   a specification-change member capable of making the plurality of contact points and the plurality of contact sections contact with each other in a predetermined combination;
   an operation member for selecting a mode of the camera;
   a detection switch for detecting an operation on the operation member; and
   control means for confirming a combination of contact states between the plurality of contact points and the plurality of contact sections and determining the mode to be selected next based on a result of the confirmation, each time an output is obtained from the detection switch with the camera set in an arbitrary mode state,
   wherein the control means is compatible with a plurality of specifications, and the specification of the camera is changed by changing a combination of the conducting states between the plurality of contact points and the plurality of contact sections.

18. A camera according to claim 17, further comprising:
   an electric board having a plurality of communication lands for rendering an external device and the control means communicable with each other, the plurality of contact points, and the control means; and
   a camera exterior member having an opening section where the plurality of communication lands and the plurality of contact points can be exposed, and a specification-change member installation section where the specification-change member is installed.

19. A camera according to claim 18, further comprising a display element provided on the electric board and exposed through the opening section of the camera exterior member, wherein
   the specification-change member has a light-transmissible section where the display element can be observed and a light-shielding section which disables observation of the plurality of contact points.

20. A camera according to claim 17, wherein the contact sections of the segment can be cut out between the connection section and the plurality of contact sections, such that the plurality of contact points and the contact sections can contact in a predetermined combination.

21. A camera according to claim 20, wherein the segment has a plurality of notch sections provided between the plurality of contact sections and the connection section, and a predetermined one or ones of the contact sections are cut out at the notch sections, such that the plurality of contact points and the contact sections can contact in a predetermined combination.

22. A camera according to claim 20, wherein the camera exterior member has a segment holding section for holding the segment at the connection section thereof.

23. A camera according to claim 17, wherein the specification-change member has a plurality of operation member installation sections where operation members for rendering the contact sections and the contact points conductive can be attached, and
   the operation members in a predetermined combination are attached to the plurality of operation member installation sections, thereby to render the plurality of contact sections and the plurality of contact points conductive in a predetermined combination.

24. A camera according to claim 18, wherein the segment is fixed to the electric board at the connection section of the segment.

25. A camera capable of changing a specification, comprising:
   a plurality of switches;
   a specification-change member for rendering a predetermined combination of the plurality of switches conductive;

an operation member for selecting a mode of the camera, a detection switch for detecting an operation on the operation member;

control means for setting the mode of the camera in correspondence with conducting states of the plurality of switches when an output is obtained from the detection switch;

an electric board on which the plurality of switches and the control means are mounted; and a communication land, provided in a vicinity of the plurality of switches, for enabling communication between the control means and an external device, wherein the control means is compatible with a plurality of specifications, wherein the specification of the camera can be changed by changing a combination of conducting states of the plurality of switches, and wherein the communication land is exposed in a state in which the specification-change member is detached.

26. A camera according to claim 25, wherein the specification-change member includes a projection for rendering the plurality of switches conductive.

27. A camera according to claim 25, wherein the specification-change member includes a plurality of operation-member attachment sections to which respective switch operation members are attachable for rendering the plurality of switches conductive, and the specification-change means makes a predetermined combination of the plurality of switches conductive by attaching the respective switch operation members to the plurality of operation-member attachment sections in a predetermined combination.

28. A camera according to claim 25, further comprising a display element capable of displaying the selected mode, and wherein the specification-change member is provided to cover the display element.

* * * * *